United States Patent [19]

Schmidt

[11] Patent Number: 4,766,543

[45] Date of Patent: Aug. 23, 1988

[54] WELL LOGGING DIRECT MEMORY ACCESS SYSTEM AND METHOD

[75] Inventor: Mathew G. Schmidt, Houston, Tex.

[73] Assignee: Western Atlas International, Inc., Houston, Tex.

[21] Appl. No.: 725,603

[22] Filed: Apr. 22, 1985

[51] Int. Cl.$^4$ ............................................. G01V 5/10
[52] U.S. Cl. ................................... 364/422; 250/270; 250/261
[58] Field of Search ................ 364/422; 250/261–262, 250/270

[56] References Cited

U.S. PATENT DOCUMENTS

| | | | |
|---|---|---|---|
| 3,379,882 | 4/1968 | Youmans | 250/71.5 R |
| 4,161,782 | 7/1979 | McCracken | 364/179 |
| 4,317,993 | 3/1982 | Herzog et al. | 250/270 |
| 4,327,290 | 4/1982 | Plasek | 250/262 |
| 4,381,449 | 4/1983 | Smith, Jr. | 250/270 |
| 4,471,435 | 9/1984 | Meisner | 364/422 |
| 4,507,554 | 3/1985 | Hertzog et al. | 250/270 |

*Primary Examiner*—Jerry Smith
*Assistant Examiner*—Gail O. Hayes
*Attorney, Agent, or Firm*—Patrick H. McCollum

[57] ABSTRACT

A generalized computer-based system and method for acquisition of nuclear well logging data, including downhole generation of energy and time spectral information. A downhole instrument traverses a borehole introducing high energy neutrons into the formation at prescribed depths. Resultant gamma rays are detected and converted into pulses which are amplified and conditioned.

A downhole multi-parameter analyzer stores pulse height and arrival time for each detected gamma ray whereby time and energy spectra are formed. Spectra include, alone or in combination, time spectra of the neutron source, inelastic and capture energy spectra. From the source time spectra, peaks are detected and capture and inelastic gates referenced thereto. Also thermal neutron decay between source bursts is derived. From the energy spectra peaks including hydrogen or iron are detected and used for calibration and automatic gain control of the gamma ray detector.

High speed buffer means and direct memory access enables access to memory by both the multi-parameter analyzer and CPU so as to avoid inhibiting data acquisition during processing of the acquired spectra by the CPU. Parameters including pulse discrimination level, detector gain, and gate positioning affecting the spectra generated downhole, which may simultaneously include inelastic, capture, and time distribution spectra, are variable in the analyzer by means of CPU control functions.

23 Claims, 13 Drawing Sheets

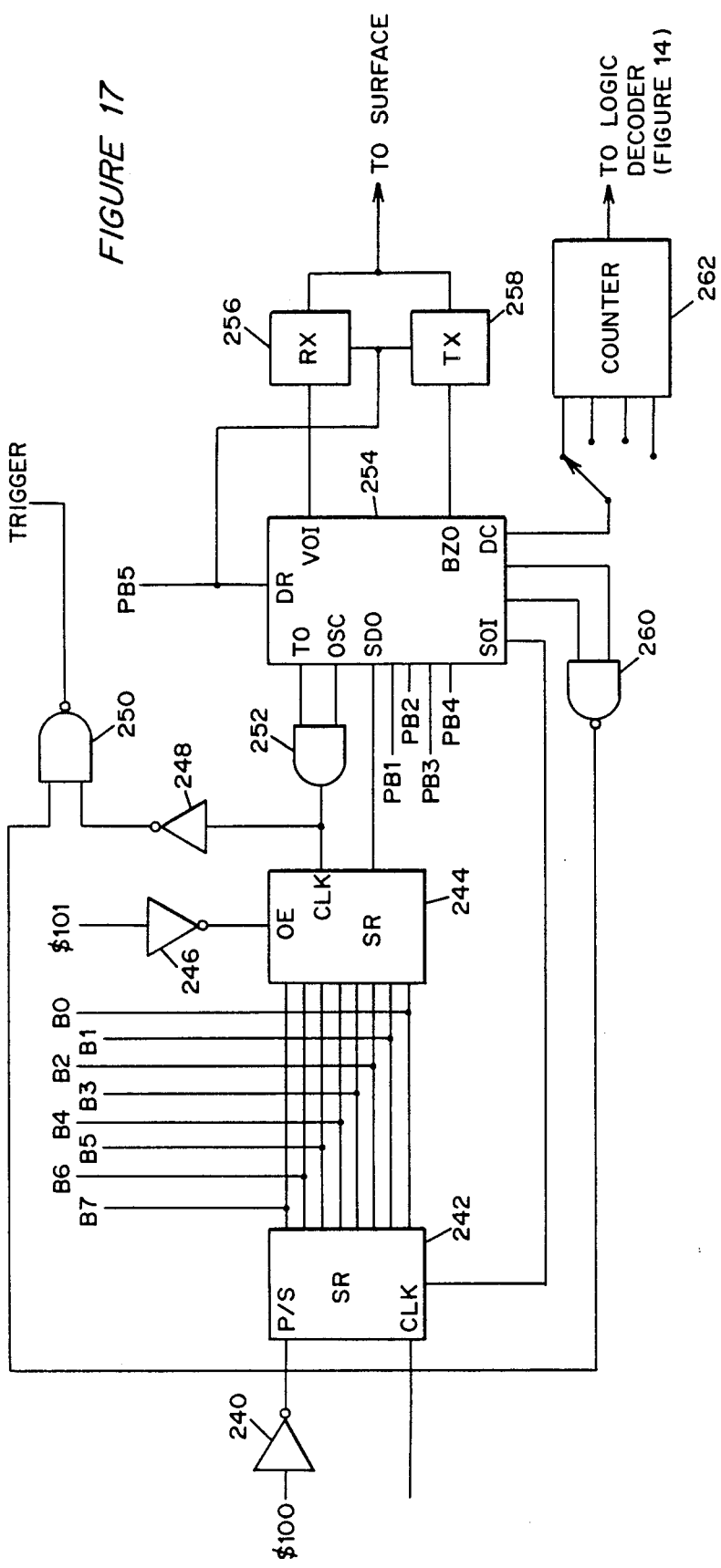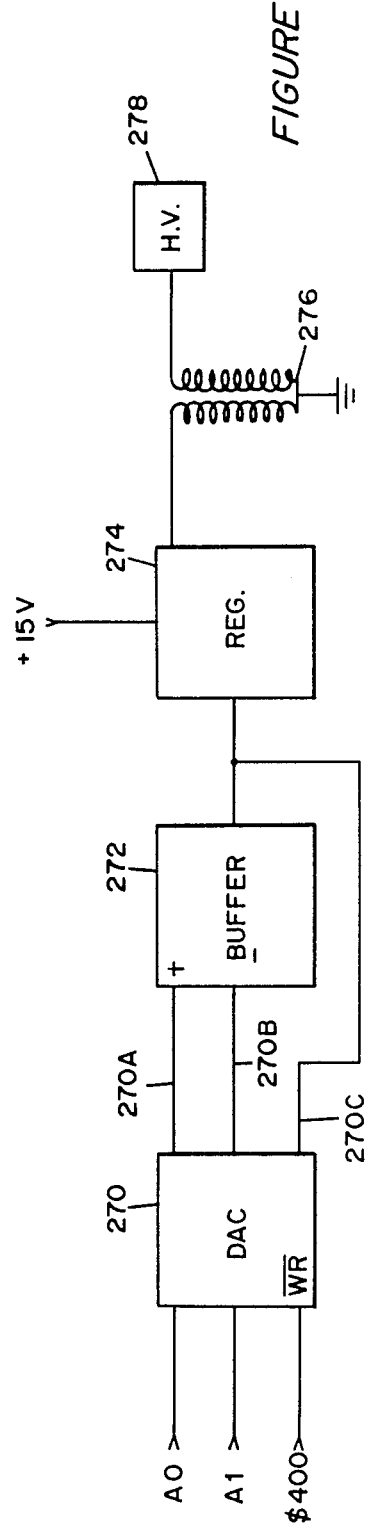

WELL LOGGING DIRECT MEMORY ACCESS SYSTEM AND METHOD

BACKGROUND OF THE INVENTION

The present invention relates to hydrocarbon well logging systems and methods; more particularly, it relates to a computer-based system and method for acquisition, presentation, processing, and recording of nuclear hydrocarbon well logging data.

Well logging systems have been utilized in hydrocarbon exploration for many years. Such systems provide data for use by geologists and petroleum engineers in making many determinations pertinent to hydrocarbon exploration. In particular, the systems provide data for subsurface structural mapping, defining the lithology of subsurface formations, identifying hydrocarbon productive zones, and interpreting reservoir characteristics and contents. Many types of well logging systems exist which measure different formation parameters such as conductivity, travel time of acoustic waves within the formation, and the like.

Still another class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a neutron source carried by the tool and pulsed at a preselected interval.

In these nuclear well logging systems, reliance is made upon the physical phenomenon that the magnitude of energies given off by a nucleus resulting from natural radioactive decay or induced nuclear radiation is indicative of the presence of certain elements within the formation. In other words, formation elements will react in predictable ways, for example, when high energy neutrons on the order of 14.2 Mev collide with the elements' nuclei. Different elements in the formation may thus be identified from characteristic gamma ray energy levels released as a result of this neutron bombardment. Thus, the number of gamma rays at each energy level will be functionally related to the quantity of each element present in the formation such as the element carbon which is present in hydrocarbons. The presence of gamma rays at a 2.2 mev energy level may, for example, indicate the presence of hydrogen, whereas predominance of gamma rays having energy levels of 4.43 and 6.13 Mev, for example, may indicate the presence of carbon or oxygen.

Accordingly, in these nuclear well logging systems, it is frequently useful to not only detect occurrence of such particles, but to further obtain data regarding their spectral distributions both in terms of time and energy. Such data can yield extremely valuable information about the formation, such as identification of lithologies which are potentially hydrocarbon producing. Moreover, this desired spectral data may not be limited to that of natural gamma rays for example, but also may be desired for the gamma ray spectra caused by bombardment of the formation with the aforementioned pulse neutron sources.

Prior art well logging systems for conducting spectral analysis of nuclear particles have conventionally included a subsurface well logging instrument which traverses a well borehole. The instrument typically includes a gamma spectrometer including a thallium-activated sodium iodide crystal optically coupled to a photomultiplier tube. A high voltage supply accelerates deuterons into a tritium target, generating a large number of 14.2 Mev neutrons, this pulsed neutron source being activated at repetition rates of 20,000 bursts per second. Subsequent gamma radiation from the formation incident upon and detected by this high resolution scintillation crystal generates a pulse of light which in turn causes the photomultiplier tube to generate electrical pulses each proportional to the gamma ray energy causing the pulse. The scintillation spectrometer, comprised of the detector-photomultiplier tube, is maintained at a low temperature in thermal isolation in a Dewar-type flask.

As the photomultiplier tube generates these electrical signals, a downhole electronic amplifier provides voltage amplification and transmits the detector voltage pulse signals in analog form uphole on a single or multi-conductor logging cable to surface instrumentation for analysis and storage. At the surface, this pulsed information is amplified and routed to a multi-channel spectral analyzer system for deriving the desired spectra. The surface multi-channel analyzer provides a total pulse count and selects pulses within prescribed energy windows for separate counting. In addition, the multi-channel analyzer may also generate a time spectrum of the detected gamma ray pulses yielding pulse counts within prescribed time windows. In one variation on the aforementioned systems, rather than sending the actual analog voltage pulses to the surface from the downhole spectrometer, in some instances systems are provided wherein each pulse is first digitized downhole, and the digitized value of the height of each pulse is transmitted to the surface for analysis.

One particular form of well logging system for performing spectral analysis of induced gamma rays is the carbon-oxygen log wherein a ratio of detected elements is used to indicate presence or absence of hydrocarbons, among other parameters. In this system, the aforementioned pulsed neutron source produces high energy neutrons which are delivered into the formation. As previously noted, when carbon and oxygen are bombarded, as with other elements, by high energy neutrons, they emit gamma rays characteristic of their respective nuclei, with the carbon gamma ray energy being 4.43 Mev and the predominant oxygen gamma ray being 6.13 Mev. In like manner to the other systems, the gamma rays are detected downhole by a scintillation spectrometer calibrated to count pulses in the energy ranges most indicative of carbon and oxygen. Information available in the spectrum analyzed includes information of the inelastic gamma rays and calcium and silicon. Also, after the inelastic reactions have ceased, measurements of the gamma rays of capture of silicon and calcium are made.

Neutrons of sufficient energy to excite a carbon or oxygen nucleus are found to exist in a subsurface formation for only a brief period of time. Accordingly, the detector is gated and synchronized to make a measurement while neutrons are being emitted from the source. A carbon/oxygen ratio is derived by taking a ratio of the gamma ray counts in the selected energy windows.

The gamma ray measurements are presented in a conventional well log format comprising continuous plotter tracks. One track is used to monitor the output of the neutron source. Adjacent tracks contain a carbon/oxygen ratio curve, a silicon/calcium ratio curve, and an inelastic calcium/silicon ratio curve.

Well logging systems for measuring neutron absorption in a formation use a pulsed neutron source providing bursts of very fast, high-energy neutrons. pulsing the neutron source permits the measurement of the macroscopic thermal neutron absoption capture cross-section ($\Sigma$) of a formation. The capture cross-section of a reservoir rock is indicative of the porosity, formation water salinity, and the quantity and type of hydrocarbons contained in the pore spaces.

Neutrons leaving the pulsed source interact with the surrounding materials and are slowed down. In a well logging environment, hydrogen in the surrounding water and hydrocarbons act to slow the neutrons. After the neutrons have been slowed to the thermal state, they are captured by atoms in the surrounding matter. Atoms capturing neutrons are in an excited state; and after a short time, gamma rays are emitted as the atom returns to a stable state.

The number of gamma rays present at any time is directly proportional to the number of thermal neutrons, i.e., the thermal neutron population. The decay rate of this neutron population is an exponential function, and is defined by specifying the time required for the thermal neutron population to decrease to one-half. This time is referred to as a neutron "half-lifetime". While it is actually the neutron lifetime that is measured, the more useful parameter is the capture cross-section. Capture cross-section and neutron lifetime are inversely related, with capture cross-section being a measure of the rate at which thermal neutrons are captured in the formation. Analysis of formation in this manner is referred to as "neutron decay analysis".

The measurement of neutron population decay rate is made cyclically. The neutron source is pulsed for 20–30 microseconds to create a neutron population. Since neutron population decay is a time-related function, only two-time referenced gamma ray count measurements are necessary. The capture gamma rays are normally detected from time intervals that are 400–600 microseconds and 700–900 microseconds after each neutron burst. As the neutron source is pulsed and the measurements made, the subsurface well logging instrument is continuously pulled up the borehole.

The recorded log consists of four curves or tracks on a plotter. The capture gamma rays measured during the first measurement time period are recorded on one track. The capture gamma rays measured during the second measurement time period are recorded on a second track. On the third and fourth tracks, there are recorded a monitor of the neutron source output and the calculated capture cross-section. Capture cross-section is continuously calculated from the measurements made during the two measurement time periods.

Along with the thermal neutron log, an epithermal neutron log may be simultaneously recorded. Also, casing collars may be recorded.

Detailed discussion of such a carbon/oxygen digital well logging system as well as general theoretical background as to such logging operations may be found in U.S. Pat. No. 4,471,435 entitled "Computer-Based System for Acquisition of Nuclear Well Log Data" to Meisner, and *Carbon/Oxygen Log*, Publication No. 9417 of the Dresser Atlas Division of Dresser Industries, Inc., and comprising a collection of eight technical papers on the subject, both of which are incorporated herein by reference for all purposes.

The prior art nuclear well logging systems just described, though proving to be a very valuable tool in oil and gas exploration, have suffered from numerous deficiencies. First, with respect to the analog systems which transmitted analog voltage pulses from the downhole spectrometer to the surface corresponding to each detected gamma ray, serious problems were encountered in pulse distortion and degradation due to limited band width on the conventional logging cables. Even with the previously described systems incorporating downhole digitization of each spectrometer pulse in an effort to avoid this pulse distortion, the system still transmitted the digital values for each pulse uphole, resulting in extremely slow system throughput. Due to the downhole instrumentation constraints of high temperature environments, low power availability, logging tool size constraints, and low signal-to-noise ratios, the approach of deriving downhole spectra was largely thought to be impractical if not impossible. Nevertheless, a well logging system and particularly a nuclear well logging system was highly desired which not only solved the pulse distortion and throughput problems, but provided better logging cable utilization which did not require the dedication of logging cable conductor time to sending the actual parameter values for each detected gamma ray pulse. It was further highly desirable to provide a nuclear well logging system with improved resolution, statistical accuracy, calibration and calibration maintenance characteristics. Still further, such a system was highly desirable which could, at the same time, provide for programmed downhole system flexibility as well as the opportunity for operator adjustment of parameters such as those affecting spectral generation including discriminator levels, detector gains, gate positions, source tracking, and temperature correction, as well as the potential for downhole spectral analysis, enhancement, and data manipulation under control from the surface or subsurface. It was still further desirable to simultaneously generate in addition to any one or a plurality of energy spectra such as the capture and inelastic spectra, various time distribution spectra for determination of capture cross-section, porosity, or the like. Moreover, it was further desirable to provide a system wherein the time spectrum if the neutron souce burst itself could be acquired. The present invention is directed to achieving these ends and in the promotion of consistent reproducible well logging spectral data at the surface.

SUMMARY OF THE INVENTION

In accordance with the present invention, a computer-based well logging system and method is provided for acquiring nuclear well logging data, including derivation in a downhole logging instrument of spectral information relating to energy and time-distribution either alone or in combination of nuclear particles detected within a subsurface earth formation.

The system includes a subsurface well logging instrument suspended within and adapted to traverse a well borehole and a surface system interconnected to the instrument by a suitable communication link such as a single or multi-conductor logging cable.

The surface system desirably includes a master controller or computer with associated storage or memory, one or more forms of visual display such as a plotter, and input/output device for communicating with the controller, and a conventional modem for communications interface between the surface system and the instrument. The surface system serves the purpose of acquisition, storage, and display of data generated by the instrument as well as providing data and command control functions to the instrument via the communication link.

As the subsurface instrument traverses the well borehole, a depth indicator provides signals indicative of the depth and rate of travel of the instrument within the borehole. In response thereto, the controller produces periodic depth command signals at prescribed depth intervals such as every quarter of a foot which may be used as command signals conveyed to the instrument for purposes of retrieving spectral data generated by the instrument within each such depth interval.

The subsurface instrument includes a detector for detecting natural or induced gamma ray emissions from subsurface formations which produces electrical pulses. Each pulse corresponds in time with the incidence of a corresponding gamma ray on the detector and has an analog voltage amplitude correlative to the energy level of the gamma ray. If the system is employed for spectral analysis of neutron-induced gamma rays, the instrument will further include a neutron source for repeatedly inducing bursts of neutrons into the formation at a preselected frequency such as 20,000 KHz.

A multi-parameter analyzer is provided within the instrument for accumulating these indications of the time of occurrence and energy levels of detected gamma ray pulses occurring during prescribed time intervals and conveyed from the detector to the analyzer. A memory within the analyzer is divided into one or more pluralities of memory locations, each plurality corresponding to a different spectrum, whether a time-distribution or energy spectrum.

With respect to a time-distribution spectrum, each memory location uniquely corresponds sequentially to a different time window or channel having a preselected discrete time width and is employed to accumulate a count of gamma rays occurring within that particular time window during a preselected time interval. In one embodiment, these windows will be referenced to the time of firing of the aforementioned neutron source.

In like manner, for a given desired energy spectrum, each memory location uniquely corresponds sequentially to a different adjacent energy window or channel having a preselected discrete energy width, and is utilized to accumulate a count of gamma rays occurring within that particular energy window during a preselected time interval.

The analyzer further includes pulse height analyzer circuitry for generating digital representations of the energy levels of the detected gamma rays and reference clock circuitry for sequentially generating memory address codes each corresponding to the sequence of memory locations for each time spectrum to be acquired. Each time a gamma ray is detected, the thus-generated time window address code present during that gamma ray's detection is employed to address the correlative memory location for each time-distribution spectrum corresponding to that time window during which the gamma ray occurred. The count in each of these memory locations is thence incremented by one. Similarly, each time a digital representation of the energy level of a detected gamma ray has thus been generated, a central processing unit or CPU within the instrument generates address codes corresponding to the energy windows or channels in each defined energy spectrum having an energy range which the particular digital representation falls within. These address codes are thence employed to increment the count resident in each of these energy channels or memory locations.

The multi-parameter analyzer thus automatically accumulates counts for both the time and energy spectra by the aforementioned address code generation. A high speed first-in-first-out buffer interposed between the digital-to-analog converter and memory of the analyzer temporarily stores these counts of pulse height and arrival time data for later accumulation in the analyzer memory to the enhance data acquisition rate of the analyzer. A direct memory access bus is provided between the instrument's CPU and the memory of the analyzer. In this manner, the CPU accesses the spectral data thus being acquired by the memory of the analyzer, either under downhole or surface control as desired, such as upon occurrence of depth interrupt commands, without affecting acquisition of the spectral data.

The CPU will periodically acquire this spectral data from the analyzer memory as desired for transmission to the surface, storage in CPU memory, or downhole analysis, also as desired.

A feature of the present invention is the flexibility provided by the instrument CPU, either alone or in response to surface-generated commands from the surface CPU, in controlling and defining the various spectra being generated downhole as well as the related parameters for accomplishing this function.

With respect to surface control, prior to or during the logging operation, signals may be downloaded from the surface to subsurface CPU defining, for example, the number of spectra desired to be acquired (e.g., time-distribution, energy, or both). This initializing information may further include upper, lower, and baseline gamma ray threshold or other discrimination constraint information, the number of energy and time window channels and their widths for each desired spectrum, and the overall time interval for a given borehole depth during which a given energy or time spectrum is to be acquired.

With respect to the latter feature, the present system contemplates generalized application to various forms of nuclear well logging. For example, in performing spectral analysis of naturally-occurring gamma rays, the aforementioned energy and/or time-distribution spectral counts may be permitted to be acquired in the memory of the analyzer for a predetermined time interval corresponding to a distinct increment of borehole, whereupon these accumulated counts of the energy and/or time spectra may be transmitted to the surface. As the instrument traverses to a different borehole increment, the memory locations corresponding to the spectra may be cleared in response to the instrument CPU, and yet additional spectra may be acquired for a subsequent time interval corresponding to a different borehole elevation or increment.

In like manner, with respect to spectral analysis of neutron-induced or pulsed neutron sourced gamma rays, with each neutron burst inelastic scattering gamma rays are conventionally produced and detected during the first time interval, whereas capture gamma rays are produced and detected during a subsequent second time interval. In such an application, an energy or time-distribution spectrum for both may desirably be acquired after each source firing and for each time interval, e.g., an energy and/or time spectrum may be produced, as desired, after each source firing for the inelastic gamma ray time interval as well as for the capture gamma ray time interval. In this instance, the accumulated counts in the memory locations corresponding to the spectra may desirably be allowed to accumulate over a repeated number of source firings while the instrument is adjacent one increment of borehole wherein gamma rays occuring during the first time interval are utilized only to increment counts in one set of memory locations corresponding to an inelastic spectrum. In like manner, pulse height or arrival time indications occuring during the second time interval after source firing may be utilized only to increment counts in other memory locations corresponding to a capture gamma ray spectrum, whether an energy or time-distribution spectrum as desired. These inelastic or capture spectra, whether energy or time related may then be transmitted to the surface after being acquired over a preselected number of source firings or time interval as desired, which may correspond to generated spectra functionally related to an increment of borehole, whereupon these memory locations will be cleared in preparation for acquisition of subsequent like-spectra corresponding to a different borehole elevation or increment or a subsequent overall time-interval. Due to the aforementioned address code generation corresponding to time of occurrence of detected gamma rays, the subsurface CPU provides a gating or routing function routing gamma ray energy or time indications to the appropriate inelastic or capture spectrum being acquired. Also, both the energy level and occurrence time of each detected gamma ray is being used to generate both time and energy spectral data during the same borehole pass.

In yet another application, it may be desirable to accumulate a total energy or time spectrum acquired after each neutron source firing in which case separate memory register in the memory of the analyzer will not be set up by the CPU to acquire separate spectra each related to the two aforementioned inelastic and capture time intervals after each source firing. Rather, all such detected gamma rays after a particular firing of the source will be accumulated in one energy or time-distribution spectrum and associated memory locations for each spectrum. In addition to the aforementioned spectrum formation information transmitted to the instrument from the surface relating to the number of channels and the like defining each spectrum, this information may include information defining the time of occurrence and length of time of each of the first and second time intervals corresponding to the inelastic and capture gamma rays relative to the source firing for purposes of the subsurface CPU correspondingly adjusting the memory locations in the analyzer memory, such inelastic or capture time interval gating being variable as desired.

Another feature of the present invention is provision for the subsurface CPU to analyze the various spectra being generated and to automatically adjust the logging operation in response thereto, or to perform a subsurface generation of a function of such acquired spectra. Accordingly, the subsurface CPU may perform analysis of a time-distribution spectrum acquired by the analyzer during the source firing for purposes of source tracking by detecting the source spectrum peak. An automatic gain control or source firing or inelastic-capture gate adjustment signal may then be generated in response thereto. Thus, the instrument is provided with a gain control circuit whereby in response to a digital gain control signal generated by the subsurface CPU, the ga-in control circuit will generate a high voltage supply functionally related thereto which supplies power to the photomultiplier tube of the detector. Because the entire time spectrum of each single source firing is capable of being acquired the thermal neturon decay may thus be derived between source bursts. Similarly, the spectra thus generated subsurface by the instrument may be analyzed and processed by the subsurface CPU to derive, for example, parameters including the macroscopic thermal neutron absorption capture cross-section of the formation at borehole elevations corresponding to the locations from which such spectra were derived.

BRIEF DESCRIPTION OF THE DRAWINGS

The written description setting forth the best mode presently known for carrying out the present invention and of the manner of implementing and using it is provided by the following detailed description of the preferred embodiment which is illustrated in the attached drawings wherein:

FIG. 17 is a schematic diagram of the modem circuitry of FIG. 5;

FIG. 18 is a schematic diagram of the gain control circuitry of FIG. 5; and

DETAILED DESCRIPTION OF THE PREFERRED EMBODIMENT

Figure 1:
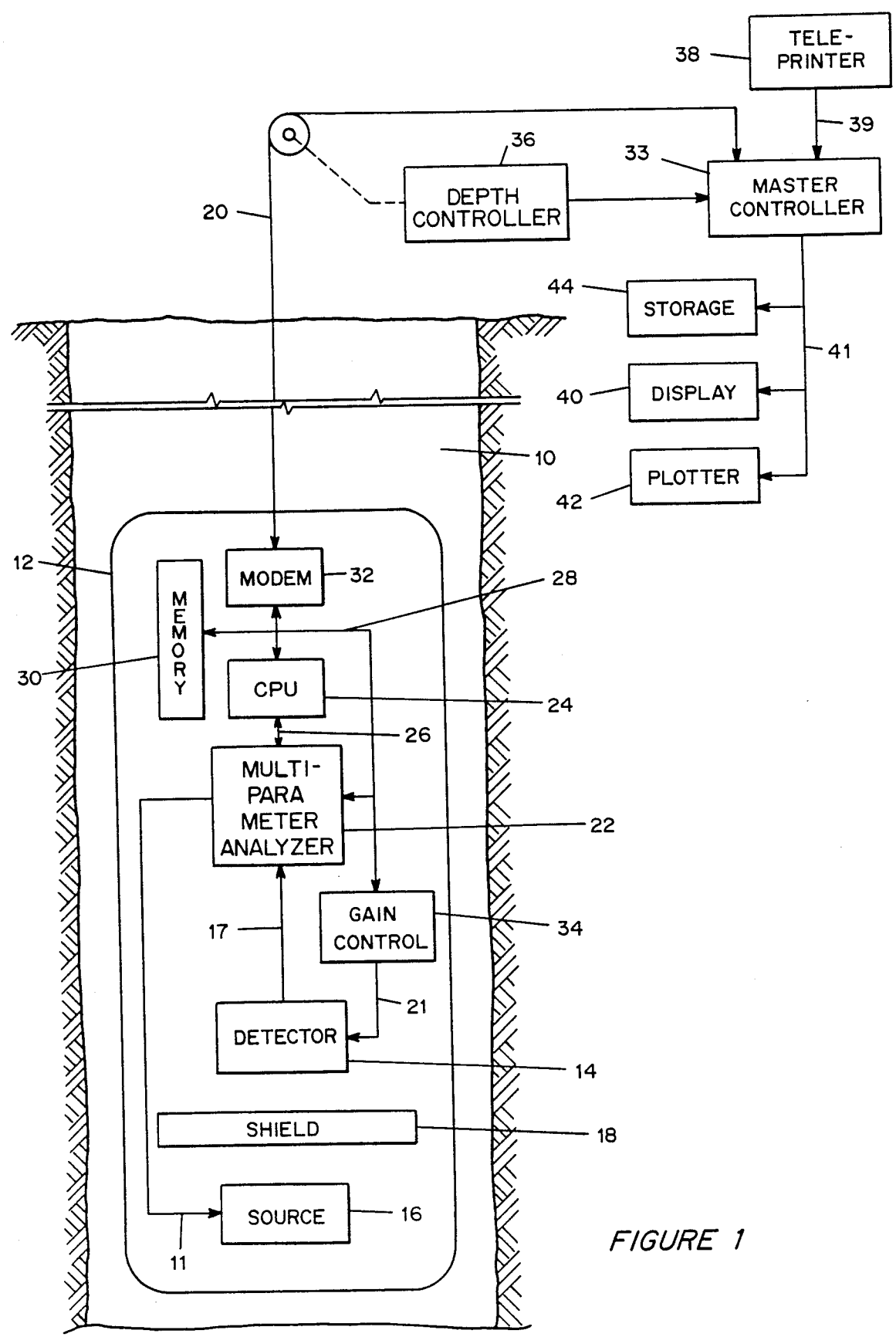
FIG. 1 is an overall schematic diagram of the nuclear well logging system of the present invention.

Referring now to the drawings in detail, and particularly to FIG. 1, there is illustrated a nuclear well logging configuration in accordance with the present invention. A well 10 penetrates the earth's surface and may or may not be cased depending upon the particular well being investigated. Disposed within well 10 is a subsurface well logging instrument 12. The system diagram in FIG. 1 is a microprocessor-based nuclear well logging system using multi-parameter analysis of detected gamma radiations. Well logging instrument 12 includes a detector system 14 and a pulsed neutron source 16. In the preferred embodiment, detector system 14 is comprised of a thallium activated sodium-iodide crystal which is coupled to a photomultiplier tube. To protect the detector system from the high temperatures encountered in boreholes, the detector system may be mounted in a Dewar-type flask. Also, in the preferred embodiment, source 16 comprises a pulsed neutron source using a deuterium-tritium reaction wherein deuterium ions are accelerated into a tritium target, thereby generating neutrons having an energy of approximately 14 Mev. A radiation shield 18, preferably of tungsten or brass, is interposed between source 16 and detector system 14. Cable 20 suspends intrument 12 in borehole 10 and contains the required conductors for electrically connecting instrument 10 with the surface apparatus.

The output from the photomultiplier tube of detector system 14 is coupled by line 17 into multi-parameter analyzer 22. As will be explained in greater detail later herein, multi-parameter analyzer 22 includes a clock circuit having an output 11 thereof coupled to source 16. Thus, source 16 will be pulsed at a repetition rate established by the clock circuit. Typically, the repetition rate of source 16 will be from between approximately 20,000 KHz to approximately 50,000 KHz.

Multi-parameter analyzer 22 is also coupled to a central processor unit (CPU) 24 by bus 26. The CPU 24 may suitably be a microcomputer system. CPU 24 is coupled through CPU bus 28 to memory 30, modem 32, and gain control 34. The output of gain control 34 is coupled by line 21 into detector system 14. Modem 32 is coupled to cable 20 for transmission of nuclear well logging data over a communication link to the surface apparatus.

The surface apparatus includes master controller 33 coupled to cable 20 for recovery of the nuclear data from instrument 12 and for transmitting command signals to instrument 12. There is also associated with the surface apparatus depth controller 36 which provides signals to master controller 33 indicating the movement of instrument 12 along the borehole and an indication of the depth of instrument 12 in the borehole 10. Teleprinter 38 is coupled to master controller 33 by line 39 to allow the system operator to provide selected input into master controller 33 for the logging operation to be performed by the system. Display unit 40, plotter 42, and mass storage unit 44 are coupled to master controller 33 by bus 41. The primary purpose of display 40 and plotter 42 is to provide visual indications of the generated logging data as well as systems operation data. Storage 44 is provided for storing of logging data generated by the system as well as for retrieval of stored data and system operation programs.

In a well logging operation such as is illustrated in FIG. 1, instrument 12 is caused to traverse borehole 10 in a conventional manner. It will be recalled that due to the output 11 of the clock circuit within the multi-parameter analyzer 22, the source 16 will be continuously pulsed at a desired rate which is typically 20,000 KHz. This, in turn, causes a burst of high energy neutrons on the order of 14 Mev to be introduced into the surrounding formation to be investigated. In a manner previously described, this population of high energy neutrons that are introduced into the formation will, in turn, cause the generation of gamma rays within the formation of varying energies and occurring at varying times which will impinge on the detector 14. As each gamma ray thus impinges upon the crystal-photomultiplier tube arrangement in detector system 14, a characteristic voltage pulse having an amplitude functionally related to the energy of the particular gamma ray is delivered on line 17 to the multi-parameter analyzer 22. It will be recalled that both the time distribution spectrum as well as the energy distribution spectrum of these generated gamma rays contain a wealth of information about the characteristics of the formation being investigated, and thus the purpose of shield 18 is to insure that the gamma rays being detected are from the surrounding formation and not due to neutron bombardment of the detector 14 directly from the source 16.

The purpose of multi-parameter analyzer 22 may be more clearly understood with reference to the illustrative gamma ray spectra indicated in FIGS. 2 through 6. From the foregoing, it will be recalled that each element in the formation when excited by high energy neutrons will emit gamma ray radiation having energies characteristic of the particular element. In like manner, the time distribution of the occurrence of each of these gamma ray pulses can also yield extremely valuable information. As but one example, the peak of the time distribution of detected gamma rays shown in FIG. 4 may be used to perform tracking of the source 16. As but another example, in the system being described, a certain amount of "dead time" is experienced due to finite time required for analog-to-digital conversion of gamma ray pulse heights and the like which adversely affect the spectra being derived. Derivation of a gamma ray time distribution spectrum such as that shown in FIG. 4 which includes time in which the source fires as well as to either side thereof would enable corrections for this dead time in the spectra. As a final example of the use of a gamma ray time distribution spectrum, such a spectrum permits inference of the neutron decay spectrum or flux in the formation of the gamma rays thus received due to the source burst. This information, in turn, will permit inferring the macroscopic neutron absorption coefficient or capture coefficient.

Figure 2:
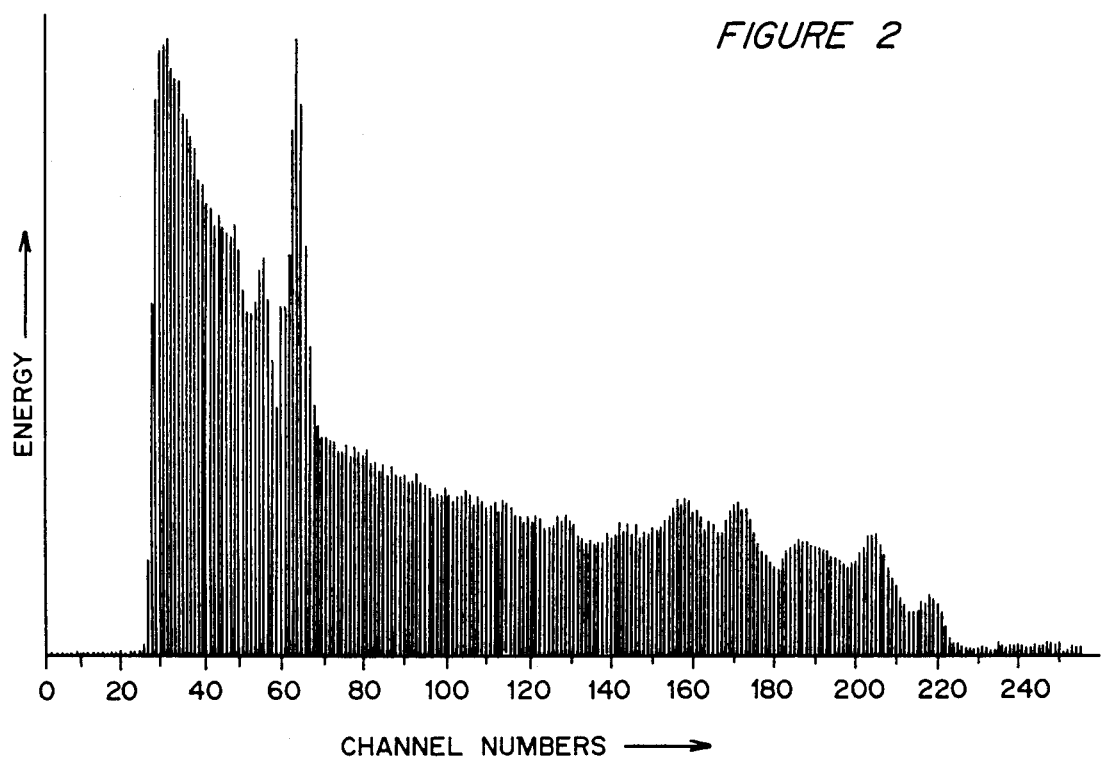
FIG. 2 is a representative display of neutron decay analysis data, the capture gamma ray energy spectrum acquired by a well logging system in accordance with that illustrated in FIG. 1.

From the foregoing, it will thus be noted that it is desirable to have the capability of generating energy and time distribution spectra for the gamma rays being detected by the detector 14, and thus the multi-parameter analyzer 22 is provided for this purpose. FIG. 2 indicates a typical gamma ray capture energy spectrum generated by analyzer 22. It may be observed from FIG. 2 that the ordinate represents the number of gamma rays being detected by the detector 14 at energies corresponding to discrete channel numbers indicated along the abscissa. More particularly, the presence of hydrogen may thus, for example, be seen as a peak in the gamma ray account occurring in channel 64 which corresponds to 2.2 Mev gamma rays.

Figure 4:
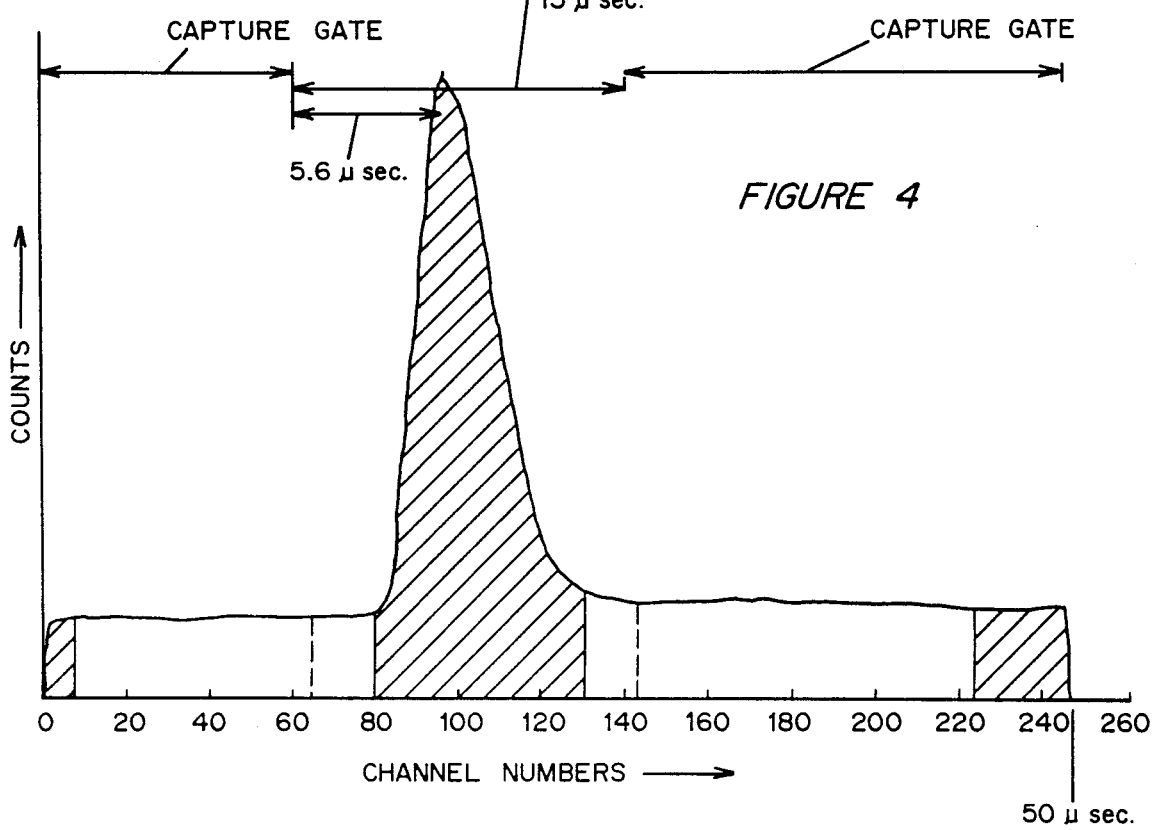
FIG. 4 is a representative display of another example of time distribution analysis data acquired by a well logging system in accordance with that illustrated in FIG. 1.
Figure 3:
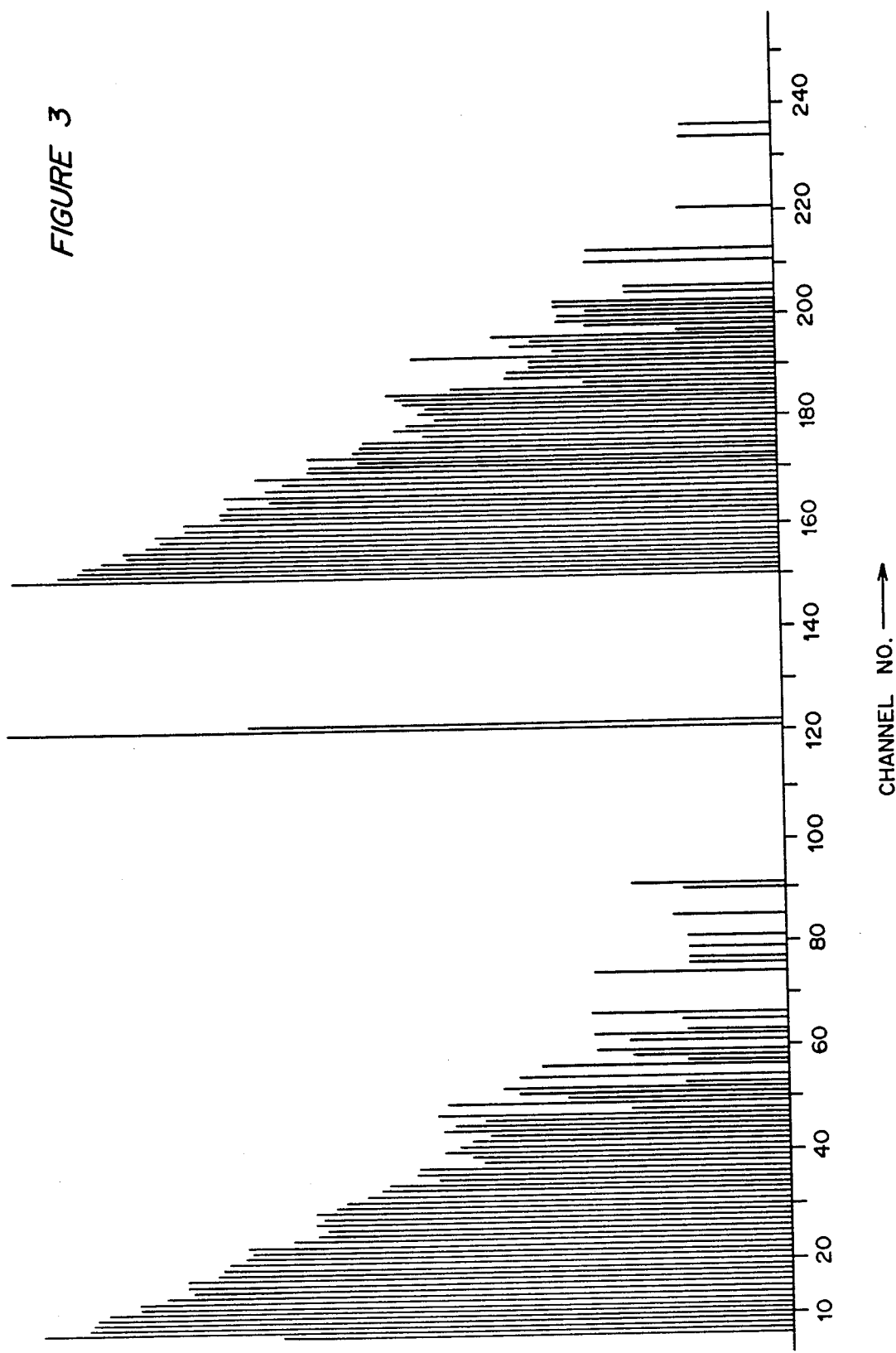
FIG. 3 is a typical display of two time spectra which may be generated by the present system.

In like manner, with respect to FIGS. 3 and 4, which are time distribution spectra for observed gamma rays by the detector 14, as the source 16 is triggered by line 11 and becomes increasingly active, the number of neutrons irradiating into the surrounding formation per unit of time increases until the maximum burst of the source 16 is reached, after which the count rate of such neutrons decreases. It will be expected that the gamma ray count detected by the detector 14 would observe a similar peak as in fact evidenced by the peak in FIG. 4. The abscissa will conventionally be divided into a preselected number of channels which, in the data depicted in FIG. 4, is arbitrarily selected as 250, with each increasing channel number corresponding to a discrete window of time occurring increasingly farther from a time reference point.

Figure 5:
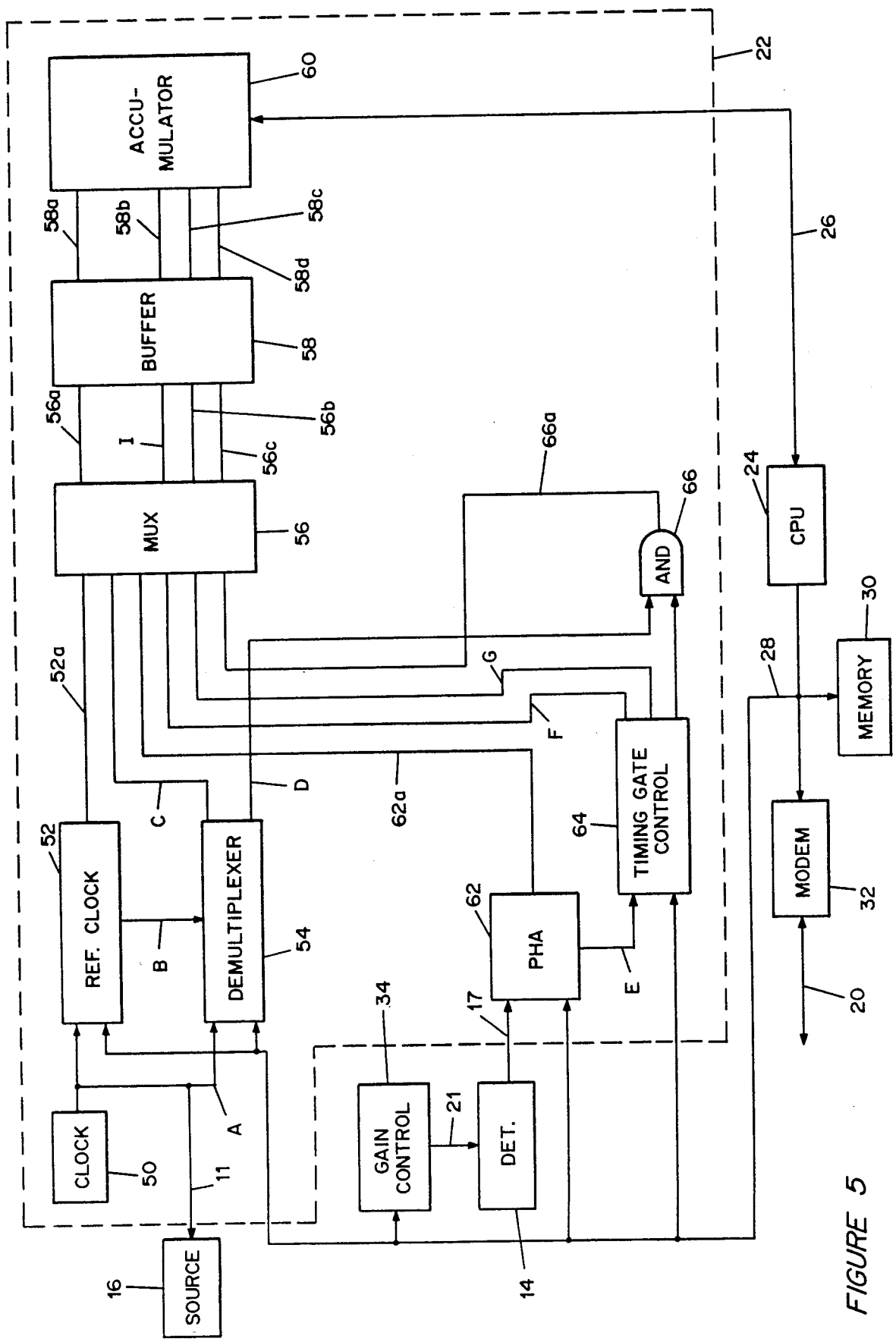
FIG. 5 is a simplified clock diagram providing a more detailed representation of the well logging instrument circuitry illustrated in FIG. 1 and in particular, that of the multi-parameter analyzer.

As aforementioned, the purpose of the multi-parameter analyzer 22 is thus, in part, to form these energy and time distribution spectra for the detected gamma rays being delivered to the analyzer 22 on line 17 from the detector 14. prior to discussing the analyzer 22 in greater detail with reference to FIG. 5, it will be helpful to consider in general the manner in which these spectra are thus created. It will be recalled that as each individual gamma ray is detected by the detector 14, a corresponding voltage pulse appears on line 17, the amplitude of which is functionally related to the energy level of the particular gamma ray. In the analyzer 22, each such analog voltage pulse is converted by an appropriate analog-to-digital converter in the analyzer 22 to a discrete digital value corresponding to the height of the pulse and thus the energy level of the gamma ray which caused it. Additionally, circuitry is provided in the analyzer 22 for not only detecting the occurrence of the peak of each of these voltage pulses, but also the time of occurrence relative or referenced to a start time functionally related to the time of firing or energizing of the source 16. Thus, for each such voltage pulse and corresponding detected gamma ray, a digital representation of the time of occurrence of the pulse as well as its height is accordingly generated in the analyzer 22.

Discussing only the generation of energy spectra within the analyzer 22 for the moment, the gamma ray range for which the energy spectrum is desired is divided into a plurality of discrete adjacent energy windows and corresponding channel numbers such as those indicated in FIG. 2. For example, the range of 1.78–7.64 Mev may be divided into 167 adjacent or consecutive energy windows or channels, each 0.035 Mev wide. The accumulated count in the 62d channel in the range would then accordingly correspond to gamma rays occurring at the 3.92 Mev energy level within the 0.035 Mev window width of the 62d channel during a preselected time interval, such gamma rays at that energy level being indicative of presence of carbon.

Memory locations are provided in a suitable memory in analyzer 22, each of which corresponds to a different channel number and thus energy range. These locations have the capability of being incremented by occurrence of a digital number corresponding to the location's channel number. Thus, when a gamma ray of a given energy level is detected by the detector 14, the corresponding voltage pulse height is digitized by the analyzer 22 and converted into a digital word or channel number corresponding to the energy range in which that gamma ray occurred. The memory location corresponding to that channel number is thus addressed and incremented by one. Over a period of time during which the energy spectrum is being accummulated, gamma rays will be expected to occur at varying energy levels corresponding to the elements in the formation which generated them. Each such gamma ray of differing energy levels and corresponding channel numbers, will thus, over the period of time of generation of the spectrum, cause the discrete count of such gamma rays occurring in the corresponding channel number or bin in the memory to be incremented. Over a period of time, as each of the counts in each discrete bin is accumulated, an energy spectrum euch as the illustrative spectrum depicted in FIG. 2 will be formed. By interrogating each of the memory locations in the analyzer 22 to obtain the digital count in each channel number corresponding to the count of gamma rays detected within that channel number or energy range, a visual indication of the spectrum such as that of FIG. 2 may be created.

The time spectrum generating function of the analyzer 22 such as that illustrated in FIGS. 3 or 4, will now be discussed in general prior to a more detailed description of the analyzer 22 with reference to FIG. 5. It is sometimes desirable to derive a time spectrum which indicates the time distribution of gamma rays detected by the detector 14 independent of the energy level of these gamma rays, such as for the reasons previously given. In other words, useful information is provided by knowing the count of the total gamma rays detected by the detector 14 at preselected discrete times or time windows relative to a start or reference time. Thus, the analyzer 22 is further provided with appropriate time references for generating digital words corresponding not only to the amplitude of each detected gamma ray pulse but its occurrence in time relative to a start time. In like manner to the energy spectra derivation just described, the time period over which a desired time spectrum is to be generated may be divided into a plurality of discrete time windows and corresponding channel numbers.

For example, if it is desired to derive a time spectrum of detected gamma rays over a 50 microsecond interval (corresponding to a 20 KHz repetition rate for source 16), this 50 microsecond interval may be divided into 250 consecutive channels 1–250, each of which is 200 nanoseconds in width. Also in like manner to the circuitry in the analyzer 22 just described for generating an energy spectrum, appropriate memory locations may be provided in a suitable memory each corresponding to a different one of these time channels. The purpose of each such location is to accummulate a running count or total of the occurrence of the particular digital word assigned to that memory location and corresponding uniquely to one of the time windows or channels. Each time a gamma ray is detected by the detector 14, the time of occurrence relative to a start time is formed into a digital word corresponding to the address of one of the time channels or memory locations. The count in that memory location is thence incremented by one. Accordingly, as additional gamma rays are detected and their corresponding arrival times digitized and stored in their appropriate memory locations or channel numbers, a total count will be generated in each such memory location corresponding to gamma rays occurring within that time window interval and within the time allotted for generation of the time spectrum. Thus, also in like manner to the energy spectrum depicted in FIG. 2, by consecutively addressing each of the memory locations or channels in the memory of the analyzer 22, a visual indication such as that of FIG. 4 may be derived indicating the time distribution of occurrence of gamma rays.

Still referring to FIG. 1, the general purpose of the analyzer 22 may now be summarized. In addition, to deriving unique discrete digital representations of the energy level and time of arrival of each gamma ray pulse detected by the detector 14 and referenced to appropriate energy and time references, the analyzer 22 serves two additional basic functions. First, for a given time interval over which an energy spectrum is to be derived and a given energy range for the desired spectrum, the analyzer 22 will accummulate a total of digital counts in each of a plurality of energy bins, windows, or memory locations. Each such count will correspond to the number of gamma rays detected as of the moment of interrogation of the location which were within the energy range corresponding to the particular location. In like manner, the second additional function of the analyzer 22 for the given time interval and energy range over which the time spectrum is to be derived, is to accummulate a total of digital counts in memory locations each corresponding to the number of gamma rays detected as of the interrogation occurring within the time window corresponding to the locations relative to a reference time. Thus, energy and time spectra may both be accumulated and thus derived downhole as desired, alone or in combination thus avoiding the approach known in the prior art wherein the actual detected gamma ray pulses either in analog or digitized form are transmitted up the cable 20 for spectral analysis at the surface. Moreover, the energy and arrival time of each gamma ray is used in forming the time and energy spectra so they may be formed in one pass through the borehole.

Still referring to FIG. 1, the CPU 24 may at appropriate times internally generated, or in response to commands on the cable 20, interrogate by means of the bus 26 the analyzer 22 to retrieve spectral data as desired for transmission to the surface. This data, retrieved on the bus 26 will be delivered on the bus 28 to the modem 32 for delivery to the surface on cable 20. In the alternative, however, it is contemplated that once the spectra are thus derived, this spectral data may be stored in memory 30 by the CPU 24 for additional processing prior to delivery to the surface.

It will be appreciated that due to the presence of downhole computing and control capability as well as energy and temporal spectral generation capability afforded by the CPU 24 and analyzer 22, an extremely powerful and flexible logging system is thus provided which is not limited to particular configurations. Thus, the details of the spectra being generated by the analyzer 22 may be adaptively changed by the CPU through parameters delivered on bus 26 to the analyzer 22, in response to either software program control resident in the memory 30 or as a function of control information delivered on the cable 20 from the surface. As but a simple illustration, the number of channels, energy or time discriminator widths of each channel, signal threshold levels and the like employed by the analyzer 22 may be varied at will in response to control from the CPU 24. The flexibility afforded by this feature will become more apparent hereinafter wherein a more detailed description of the analyzer 22 and CPU 24 is provided.

Yet an additional extremely important feature to be hereinafter described in greater detail relates to the ability of the analyzer 22 to derive such spectra automatically wherein by means of a direct memory access to be detailed hereinafter, the CPU 24 may interrogate the memory of analyzer 22 to retrieve spectral data for processing, analysis or transmission without interrupting the spectral acquisition process itself. Without such feature, conventionally while the CPU 24 is retrieving spectral data from the memory 30, ability of the analyzer to derive further portions of the spectra would thus be inhibited inasmuch as the memory, while accessed by the CPU 24 is thus not available for storage of just-derived additional spectral data by the analyzer 22. High speed FIFO buffering in conjunction with the direct memory access enables this independent spectral generation simultaneously along with retrieval of such spectral information and additional processing thereof as desired, such buffering to be also described later in greater detail.

As but one additional indication of the benefits derived from processor control of the logging operation being described, in response to the information being derived by the analyzer 22, the CPU 24 may desirably provide gain control information on the bus 28 to appropriate gain control circuitry 34 which, in turn, will, in one embodiment, vary the high voltage supply to the photomultiplier tube of the detector 14 by means of control signal 21, thereby controlling the gain of the detector 14 as desired. This automatic gain control feature will also hereinafter be described in greater detail.

Each of the schematic blocks pictorially illustrated in the system of FIG. 1 will now be described in greater detail. First, with respect to the multi-parameter analyzer 22, a more detailed schematic block diagram thereof will be seen in FIG. 5 and will now be described with reference to the timing diagram thereof provided in FIG. 6.

First an overall discussion of the operation of the analyzer 22 depicted in FIG. 5 will be given, followed by more detailed discussion thereof. It will be recalled that one of the purposes of the analyzer 22 is to first convert the energy level or pulse height of each analog voltage pulse presented thereto on line 17 and corresponding to a detected gamma ray into a more convenient digital form. Thus, a pulse height analyzer 62 is provided having an output 62A which is an 8-bit digital representation of the pulse height of each such analog pulse. This pulse height 62A is delivered to multiplexer 56. Yet an additional purpose of the analyzer 22 is to derive a cumulative count of the number of gamma rays occurring in each preselected energy window over a preselected interval of time for purposes of deriving the previously described energy spectra. Accordingly, at appropriate times to be described in more detail, each such digital representation of pulse height will pass on line 62A through the multiplexer 56, through high speed buffer 58, and be accumulated in appropriate memory locations in the accumulator 60.

It will further be recalled that yet an additional purpose of the analyzer 22 is to accumulate a total count of gamma ray pulses occurring in each of a preselected number of discrete time windows so as to generate the also-described time spectrum. Thus, a series of sequential memory address locations will appear in order on line 52A from reference clock 52 which will be delivered through multiplexer 56 on line 56A through buffer 58, and on line 58A to accumulator 60, the manner of generating such address codes to be described shortly.

Each time a digital pulse height representation is presented to the multiplexer 56 on line 62A, a unique address code also appears on line 52A corresponding to the time of arrival of the particular gamma ray causing the generation of the digital representation on line 62A. This address code 52A will thus be utilized to address an appropriate location in memory residing in accumulator 60 so as to increment the count in that memory location in response to the gamma ray pulse received. Because the memory locations in accumulator 60 correspond one to one to each unique address code on line 52A, and thus each further correspond to one of the unique time windows, the cumulative counts in each of the memory locations in a corresponding portion of the accumulator 60 will thus collectively comprise the representation of the desired time spectrum of occurrence of gamma rays indicated on line 62A. Signals also to be described later will further be presented to the multiplexer 56 indicating such things as whether the gamma ray pulse indication which was just received was within an inelastic or capture time window, and whether an 8-bit value for the address code 52A or the value of the pulse height of the gamma ray on line 62A is to be passed through the multiplexer 56 for ultimate storage in the accumulator 60. In other words, due to the presence of a number of data and address signals simultaneously presented to the multiplexer 56, the basic purpose of the multiplexer 56 is to serve to permit access of only a desired such address, data, or command signal to the buffer 58 for use in incrementing only the appropriate memory location in accumulator 60.

Figure 6:
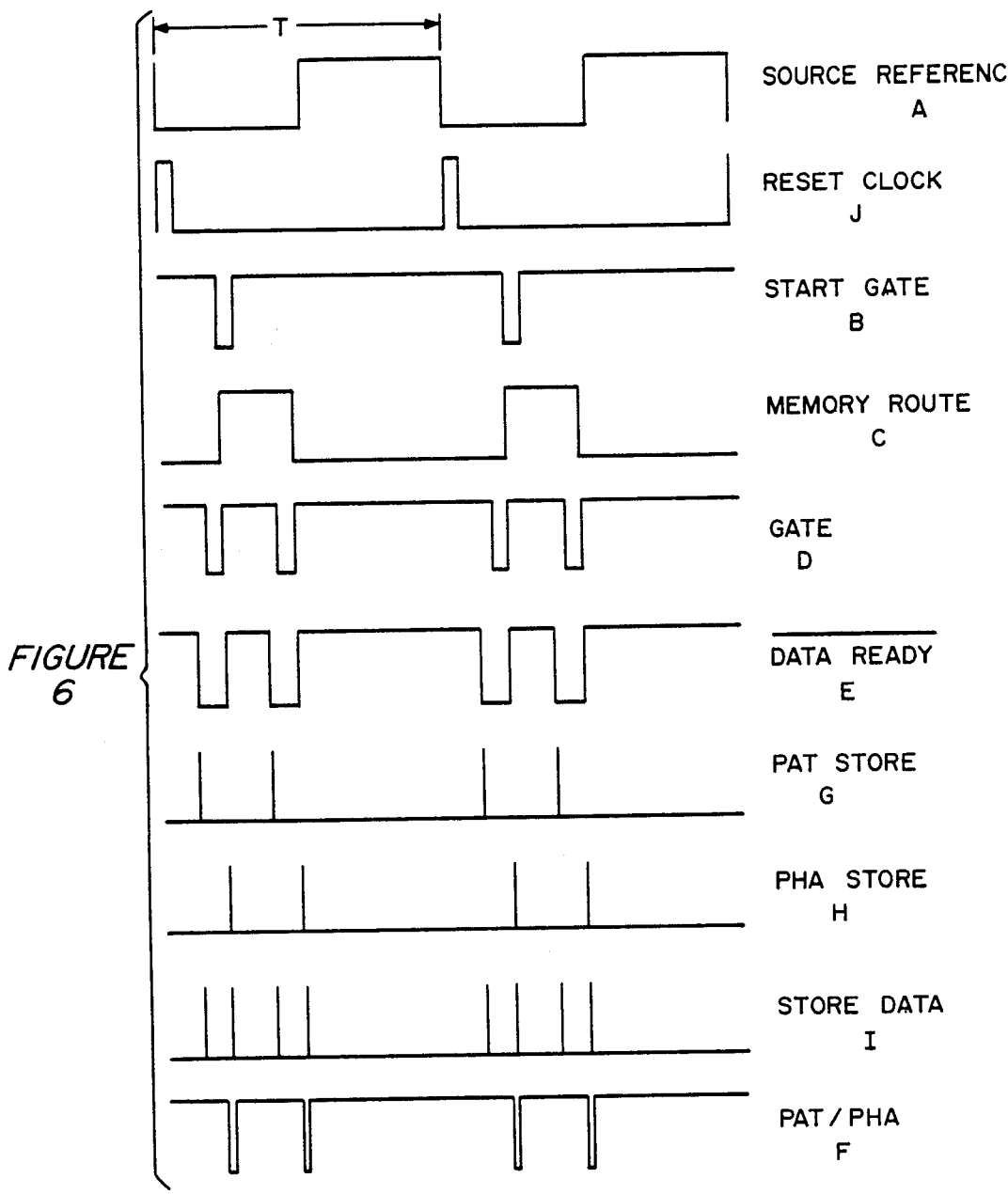
FIG. 6 is a timing diagram illustrating timing and wave forms of the signals at various locations within the circuitry of FIG. 5.

Still referring to FIG. 5, tne analyzer 22 is provided with a source or reference clock 50 which will desirably run at a repetition rate at which the source 16 is to be fired, which is typically at a 20 KHz rate. In FIG. 6, the wave form of this source-firing clock may be seen represented as wave form A, causing the neutron source 16 to fire at 50 microsecond intervals. A reference clock 52 is also provided, the purpose of which is to divide down the 50 microsecond period of the source clock 50 into shorter time windows such as the 200 nanosecond windows previously described. The further purpose of this reference clock 52 is to generate a sequence of 8-bit address codes on line 52A, each corresponding as sequentially generated to successive windows or channel numbers for derivation of a time spectrum. Accordingly, this reference clock 52 may, for example, run at a 5 MHz rate. It will be seen from the reset clock wave form J of FIG. 6 that a reset pulse is provided from clock 58 to the reference clock 52 in order to synchronize the reference clock 52 to the source-firing source reference clock 50. As previously described, these address codes on line 52A derived by counting the 5 MHz clock pulses out of reference clock 52 will be used to address memory locations in the accumulator 60. In this way, pulse counts in corresponding memory locations in the memory of accumulator 60 will be incremented each time a gamma ray pulse and a particular address on line 52A occur correspondingly in time. These address codes will pass through the multiplexer 56 as address lines 56A through buffer 58 as address codes 5A to the accumulator 60 when the multiplexer 56 is enabled to pass them in the manner to be described. It will be noted that by dividing the 50 microsecond period of clock 50 into 200 nanosecond intervals, 250 discrete channels or windows of 200 nanoseconds in width are thus created, however, such relative numbers are a matter of choice depending upon desired resolution and the like.

Now that the overall operation of the analyzer 22 has been explained, description of the operation will be given in more detail. It will be recalled that upon energization of the source 16, a population of inelastic gamma rays will be created and extinguished rapidly within, for example, a ten microsecond interval simultaneous with firing the source, followed by a population of gamma rays attributable to the capture phenomenon. It would thus be desirable to provide indications to the accumulator 60 as to whether the pulse height or arrival time data on line 62A or 52A, respectively, correspond to gamma rays arriving within the inelastic or capture windows. Thus, a demultiplexer 54 is provided for indicating to the multiplexer 56 whether the particular gamma ray indication is a capture or inelastic energy value. Under CPU 24 control, the reference clock 52 receives on main I/O bus 26 an indication that, for example, the first twenty clock cycles in the clock 52 will be considered as a time period in wnich capture pulses have been received, and that thereafter pulses are considered to be from inelastic scattering. Accordingly, the clock 52 will wait an appropriate time before generating the start gate indicated as wave form B in FIG. 6 and delivered to the demultiplexer 54. The demultiplexer 54 will, in turn, generate two wave forms shown in FIG. 6 as memory route or "MR" C delivered to multiplexer 56 and a gating pulse D delivered to AND gate 66. The purpose of memory route C is to provide an indication through the multiplexer 56, buffer 58, and ultimately to the memory in accumulator 60 as to whether values presented to the multiplexer 56 are to be stored in the capture or inelastic memory portions of the accumulator 60. Comparison of wave forms and D will indicate that when the memory route signal C is high and the gate signal D is high for the shortest period of time, the inelastic or total count gate is considered to be on. Alternatively, when the memory route C is low and the gate D is high for the longest period of time, the capture gate is considered to be on.

Referring back to FIG. 6, a data not ready signal E is generated by the pulse height analyzer 62 and delivered to timing and gate control 64. Reference to FIG. 6 indicates that this wave form E is such that it will go low upon arrival of a gamma ray pulse, and upon conversion of the pulse to digital form in the pulse height analyzer 62 (generally within a nominal 1.5 microsecond time period), the wave form E will go high indicating the conversion has been completed and it time to store the pulse height. Accordingly, timing and gate control circuitry 64 is provided for generating pulses to be delivered to the multiplexer 56 indicating which input to the multiplexer 56 is to be passed through the buffer 58 and ultimately stored in accumulator 60, e.g., the purpose of the timing and gate control circuitry 64 is to instruct the multiplexer 56 whether a pulse height value occuring during the inelastic or capture gate and presented to the multiplexer 56 is to be stored, or whether, in the alternative, the pulse arrival time of the particular gamma ray presented to the multiplexer 56 is to be stored in the buffer 58 and ultimately the accumulator 60. Thus, referring to the timing diagram of FIG. 6, the control circuitry 64 will generate pulse arrival time storage pulses at the falling edges of wave form E corresponding to instructions to store the pulse arrival time for pulses arriving in the inelastic and capture windows, respectively. In like manner, the control circuitry 64 will generate pulse height arrival storage pulses indicated as wave form H on FIG. 6 on the rising edges of the wave form E instructing the multiplexer 56 to pass pulse height data on line 62A during the inelastic and capture windows, respectively, through to the buffer 58. It will be noted that the pulse height store signal shown by wave form H is gated through AND gate 66 before delivery as signal 66A to the multiplexer 56. This gate 66 is controlled by the gate D from the multiplexer 54 which, it will be recalled, may in turn be controlled by a signal from the CPU 24 on I/O bus 26. Thus, the purpose of gating 66 is to allow the gating off of PHA store pulses when it is not desired to store certain pulse height values as, for example, when the source 16 has been turned off. Still referring to FIG. 6 store pulse line I between multiplexer 56 and buffer 58 will carry a wave form indicated in FIG. 6 which is a continuation of wave forms G and H and simply schematically indicates that the buffer 58 is instructed to store either a pulse arrival time or pulse height at the indicated times which are passed through the multiplexer 56. Finally, the wave form F delivered from control circuitry 64 to the multiplexer 56 is provided for purposes of instructing the multiplexer 56 whether a pulse arrival time or pulse height value is present to be passed through the multiplexer 56.

Figure 7:
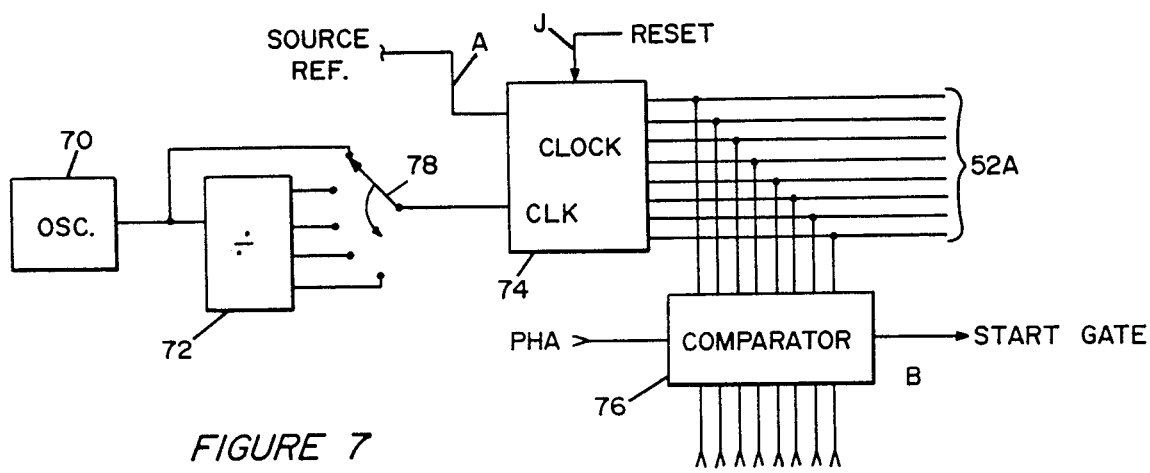
FIG. 7 is a schematic diagram of the reference clock circuitry of FIG. 5.

Referring now to FIG. 7, the reference clock 52 of FIG. 6 will be seen depicted therein schematically in greater detail. It will be recalled that one function of the reference clock 52 is to provide sequential 8-bit address code words each of which corresponds to a different time window for addressing correlative memory locations in the accumulator 60 wherein gamma ray counts will be accumulated. This function is performed by dividing down the source firing clock frequency 50 and counting the resultant divided wave form. Thus, with reference to FIG. 7, an oscillator 70 is provided which, in the embodiment being described, may be operating nominally at 5 MHz. The output of oscillator 70 is delivered to a divider 72 which may be adjusted manually by switch 78 so as to provide to the clock input of clock 74 a frequency having the period of the desired time windows for the time spectrum. As previously described, by means of the source reference line A and reset line J, the clock 74 is operating synchronously with the source firing clock 50, as may further be seen from the wave forms of FIG. 6. By dividing down and counting the period of the source reference A, output 52A from the clock 74 will be provided and delivered to the multiplexer 56 which sequentially comprise 8-bit words each uniquely associated with a next successive period or window being provided to the clock input of the clock 74. As an example, with reference to FIG. 7, when the reset clock pulse J occurs resetting the clock to the edges of the source reference A, the clock 74 will begin clocking at a 200 nanosecond rate corresponding to the reciprocal of the 5 MHz oscillator frequency 70. After the first 200 nanosecond time window clocking pulse, the output 52A will, for example, be the 8-bit digital word 00000000. When the second 200 nanosecond clock pulse occurs on the clock input of clock 74, the output 52A will then read 00000001. After the third clock input, the output will read 00000010. The output 52A will thus continue to increment each time an additional time window clock pulse of 200 nanoseconds enters the clock input of clock 74 until the decoded value of the 8-bit word on output 52A reaches 250 corresponding to 250 time windows or channels (50 microsecond period of source clock 50 divided by 200 nanosecond period oscillator 70). These sequential 8-bit address codes will be delivered through the multiplexer 56 to the buffer 58. When a gamma ray pulse is detected, as for example during the third 200 nanosecond window, an address code will be present on the output 52A unique corresponding to this window, e.g., 00000010. If it is desired to derive a time spectrum, a pulse arrival time store pulse G will be delivered from the control circuitry 64 to the multiplexer 56 causing this unique address code to pass on buses 52A and 56A to the buffer 58 whereby the memory location in buffer 58 unique corresponding to this address code and time channel will be incremented. This process will continue for a generation of the time spectrum whereby during coincidence of gamma ray pulse detection and a unique corresponding address code on output 52A, thereafter the unique memory location in buffer 58 will be incremented.

It will be recalled from the foregoing that after the firing of the source 16, a period of time passes in which detected gamma rays are primarily considered to be due to inelastic scattering, after which a next time period occurs wherein detected gamma rays are considered to be as a result of thermal neutron capture. Indication of which time period, also known as a window or gate, is important for purposes of deriving an inelastic or capture energy spectrum or time-distribution spectrum. The reason for this is that separate memory sections are reserved in the buffer 58 and accumulator 60 for accumulating these different spectra, e.g., the inelastic energy spectrum, the capture energy spectrum, and time-distribution spectra whether for total gamma rays, or as desired, gamma rays only in the inelastic or capture window. Thus, it is necessary to provide indication to the buffer 58 when a gamma ray is detected as to whether it occurred during the inelastic or capture gate so that the value of the pulse height or time of occurrence of this gamma ray increments the memory location in the proper portion of the memory corresponding to the spectrum being generated. Moreover, it is desirable to be able to selectively adjust the relative lengths of these two inelastic and capture gates. Comparison of FIGS. 5 and 7 reveals that the reference clock 52, and more particularly, the comparator 76 is in communication with the CPU I/O bus 26 whereby the CPU 24 can deliver to the reference clock 52 an indication of the desired time at which the capture gate is to start relative to the source firing. This is done by means of delivering an 8-bit word on the bus 26 to the comparator 76 corresponding to this time which may be varied and delivered to the CPU 24 through the logging cable 20 or, in the alternative, may be stored in the memory 30 prior to commencing the logging operation. In any event, stored in the comparator 76 will be an 8-bit digital word corresponding to the desired time of occurrence of the start gate B relative to the source firing and reference clock J. It will further be noted that the comparator 76 is provided with 8-bit parallel input from the output 52A of the clock 74. In this manner, as the output 52A increments upward, at some point in time, the 8-bit words on the output 52A and the 8-bit word delivered on bus 26 to the comparator 76 will be equal, at which time the comparator 76 will generate a start gate output pulse B. Inelastic and capture gate times will be referenced to this start gate B pulse occurrence time which may thus be adjustable in time relative to the peak of the source firing by the means just described in varying the word delivered to the comparator 76 on the bus 26. As will be discussed hereinafter further, the CPU 24, by means of DMA bus 26A can interrogate the various accumulating spectra in accumulator 60 in order to locate in time the peak of the source burst after a source firing pulse is delivered to source 16 in order to start the inelastic or total count gate an appropriate time from the source peak, which is typically 15 or 20 channels (or 5.6 microseconds) as shown by FIG. 4. This insures the gate is on for accumulating a total count spectrum before the source fires. The source peak will vary in time from the source firing pulse due to temperature variations and the like. Accordingly, it is a feature of the invention to track this source peak by generating a time spectrum of the source firing, analyzing it downhole, and adjusting the inelastic and capture gates in response.

The demultiplexer 54 portion of the multi-parameter analyzer 22 will now be discussed in greater detail with reference to FIGS. 6 and 8. It will be recalled that a primary purpose of the demultiplexer 54 is to provide a control signal to the multiplexer 56 so as to permit the multiplexer 56 to instruct the buffer 58 as to whether the two 8-bit words which may be appearing on bus 52A and 62A corresponding to pulse arrival time and pulse height have occurred in the inelastic or capture windows. Comparison of wave forms B, C, and D in FIG. 6 relative to the block diagram of FIG. 8 indicates that the demultiplexer 54 is first comprised preferably of a one shot multi-vibrator which triggers from the start gate pulse B which is delivered to the one shot 80. The start gate pulse B, it will be recalled, occurs a preselected time interval from the falling edge of the source reference A which fires the source 16, indication of this preselected time being delivered to the demultiplexer 54 from the reference clock 52 on line B. It will recalled that this start gate time pulse B is variable with respect to and referenced to the source reference A by means of varying the 8-bit word delivered on bus 26 to the comparator 76 of reference clock 52. The memory route signal C thus generated by one shot 80 of the demultiplexer 54 will go high for a portion of time corresponding to the inelastic gate (typically 15 microseconds for a 50 microsecond source reference duty cycle), and will go low for the balance of the source reference, e.g., typically 35 microseconds and corresponding to the capture gate. This memory route signal C will be delivered to the multiplexer 56 such that when the signal C is high, the multiplexer 56 has thus received an indication that pulse arrival time or pulse height indications delivered to the multiplexer 56 on buses 52A or 62A correspond to data received during the inelastic window. In like manner, when the signal C delivered to the multiplexer 56 goes low, this indicates to the multiplexer 56 that any pulse arrival address code or pulse height data being received by the multiplexer 56 on bus 52A or 62A, respectively, correspond to address or data caused by a gamma ray pulse detection during the capture window. In addition to varying the start time of the signal C by means of varying the start gate pulse B (by, in turn, varying input to the comparator 76 of the reference clock 52 as previously described), the relative time of the capture or inelastic gates, e.g., the duty cycle of the signal C, may be varied by varying the period of the one shot 80 as desired.

Figure 8:
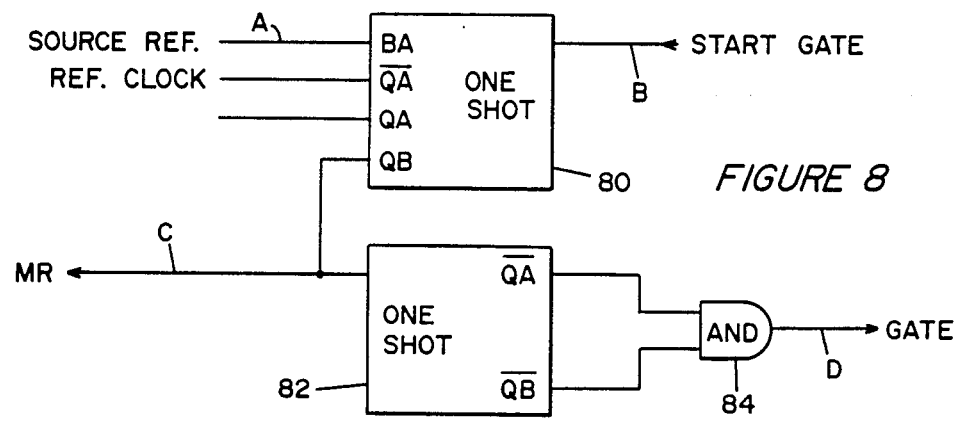
FIG. 8 is a schematic diagram of the demultiplexer circuitry of FIG. 5.

Referring to FIG. 8, the output of the one shot 80 is delivered to an additional one shot 82 for purposes of generating the gated signal D delivered to the AND gate 66 of the analyzer 22. It will be recalled that the purpose of gating the signal D by means of the gate 66 is to gate off accumulation of data during the inelastic or capture times as desired. The QA and QB outputs of one shot 82 trigger on the leading and falling edges of the input C and, accordingly, when anded through gate 84, result in the desired output gate signal D which is routed to the AND gate 66. Thus, when signal D goes high for a short period of time, this time period corresonds to the inelastic gate being on, whereas when the signal D goes high for the longer period of time, this corresponds to the capture gate being on. Both of these times may, of course, be gated as desired by signal H into the AND gate 66 for delivery as output signal 66A to the multiplexer 56 whereby data may be passed through or inhibited from passing through multiplexer 56 in response to the gated signal 66A.

The pulse weight analyzer 62 portion of the multi-parameter analyzer 22 will now be discussed in greater detail with reference to FIG. 9, which is a schematic block diagram of the pulse height analyzer 62, and FIG. 10 which is a timing diagram corresponding to FIG. 9. First, a general discussion will be given of the purpose and operation of the pulse height analyzer 62 with reference to the timing diagram of FIG. 10, followed by a more detailed discussion of the operation of the components shown in FIG. 9. The primary purpose of pulse height analyzer 62 is to receive an analog voltage pulse on line 17 corresponding to a gamma ray detected by detector 14, to convert the height of this pulse (which corresponds to the energy level of the detected gamma ray) to a corresponding digital word, and to deliver this digitized value for the pulse height on bus 62A to the multiplexer 56, thence to the buffer 58, and ultimately to the accumulator 60 for storage in the memory location of the appropriate energy spectrum being accumulated.

Figure 10:
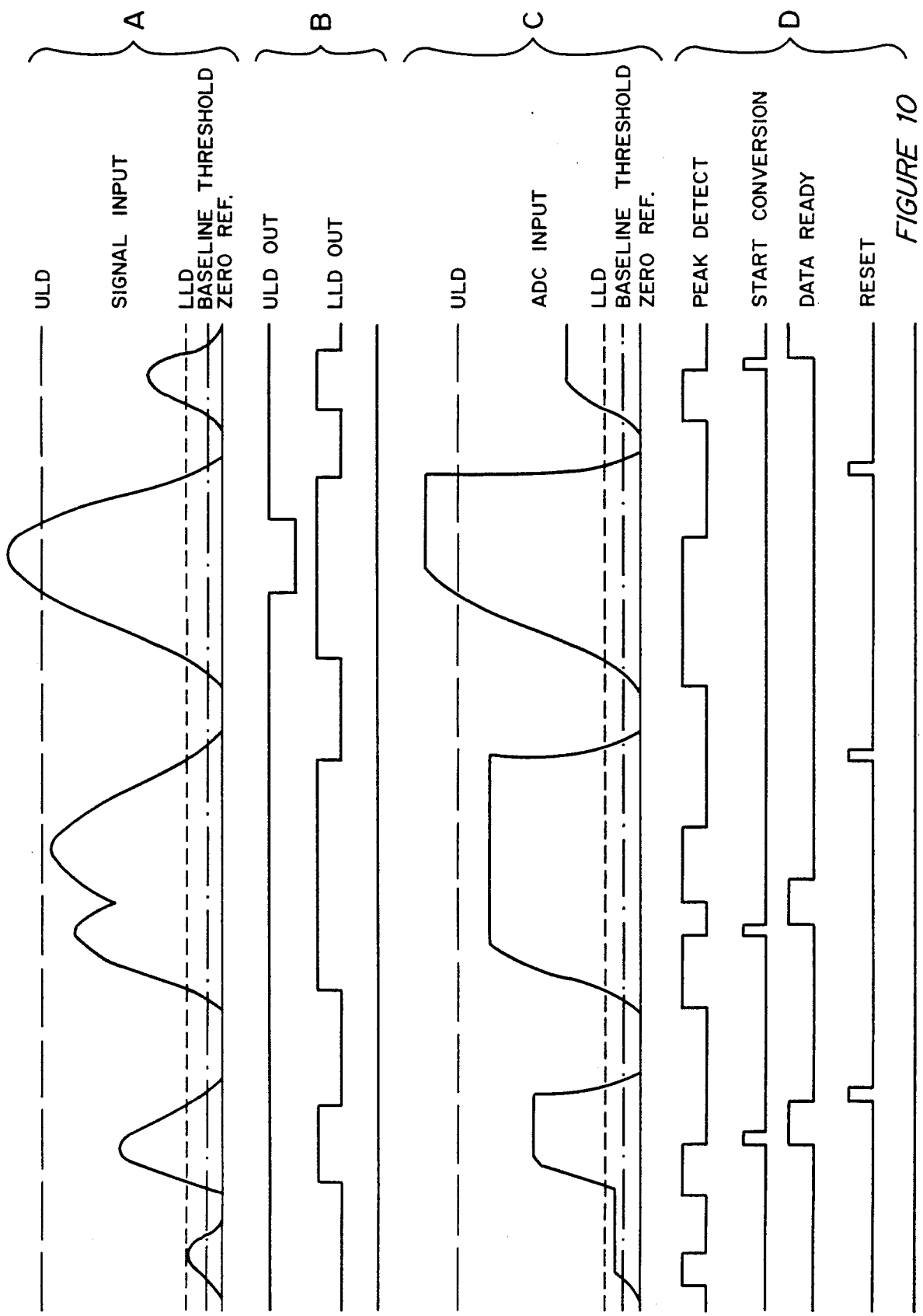
FIG. 10 is a timing diagram illustrating timing and wave forms of the signals at various locations within the circuitry of FIG. 9.

The wave form A shown in FIG. 10 is intended to represent a typical analog input signal on line 17 to the pulse height analyzer 62 from the detector 14. Several characteristics may be noted from this wave form. First, as expected, the amplitude of the signal will vary as a function of the energy level of the gamma rays detected. An upper level discriminator (ULD) and a lower level discriminator (LLD) value may be selected as a function of the dynamic range of the analog-to-digital converter and the like which is selected for digitizing the analog gamma ray input signal, as shown by the dotted lines in wave form A. Thus, some of the pulses such as the first pulse of the input signal 17 will not reach this LLD value, whereas others such as the fifth, will exceed the ULD value. Indications are desirable as to when the input signal level 17 is outside the analog range suitable for conversion to digital form. With reference to wave forms B of FIG. 10, such indications may be provided by a digital ULD output signal and a digital LLD output signal. Comparison of wave forms B with the input signals A indicates that the ULD output or "ULD out" will go low only when the input signal 17 exceeds the upper ULD value. Similarly, the LLD output or "LLD out" signal will be low anytime the input signal 17 falls below the LLD threshold level. These two signals, ULD out and LLD out, may be used to inhibit delivery of the input signal 17 to an analog-to-digital converter when the input signal exceeds or falls below the ULD or LLD reference levels, respectively. The purpose of this is to avoid, for example, saturating the A to D converter or avoiding non-linearities in the A to D output when exceeding the maximum range of the A to D converter in the former case, and in the latter case, in order to avoid converting analog signals not having a level high enough to meet the input requirements of the A to D converter for an output with an acceptable signal to noise ratio.

An additional aspect of the wave form A of FIG. 10 may be seen, namely provision for a baseline threshold value. It is desirable to convert the peak of each analog pulse comprising the input signal 17, and this may be conventionally done by differentiating the input signal in that the differential of the signal will be zero at its inflection point. However, in the alternative, the differential relative to an adjusted baseline threshold taken as zero will change in sign indicating zero crossing points of the zero input relative to the threshold which may be used for interpolating therebetween to detect the peak of the input signal 17. Comparison of the peak detect signal in wave forms D of FIG. 10 relative to the portions of the input signal exceeding the baseline threshold of wave forms A of FIG. 10 indicate that such a peak detect signal will desirably thus be produced which goes low at the occurrence of each peak of the input signal 17. This peak detect signal indication of the occurrence of the peak input signal may thence be used as the value of the input signal to hold in a sample and hold circuit as the peak signal for conversion from analog to digital form, in a manner to be described hereinafter.

Yet an additional feature of a typical input signal 17 shown in wave form A must be provided for, e.g., a phenomenon of pulse pileup. It will be recalled that the nature of the input signal 17 is statistical, such that gamma rays may be detected simultaneously or in close proximity, as indicated by the third and fourth pulses of the input signal 17 on wave form A. In other words, gamma rays may be detected simultaneously or almost simultaneously and so close together that due to the conversion time of a typical analog to digital converter, it is not possible to convert both values and the first must thus be selected. The third and fourth pulses in the input signal of wave form A indicate this to be the case wherein the third and fourth pulses occur so close together as to overlap. Thus, it is desirable to provide yet an the first of these overlapping input pulses so as to only convert the peak value of the first pulse, as shown by the "start conversation" signal in wave form D of FIG. 10. It will be noted that this start conversion pulse will occur on the negative going edge of the peak detect signals which corresponds to occurrence of the peak of the input signals. This start conversion pulse may be utilized for purposes of triggering conversion of the input signal at that time because the peak of the input signal is occurring at that time. However, it will be noted that due to the overlapping of the third and fourth pulses in the input signal shown in wave form A, a start conversion pulse is not generated for the fourth negative going edge of the peak detect signal corresponding to the peak of the fourth input pulse which overlaps the third input pulse. In this manner, the analog to digital converter will be provided with sufficient time to convert the third pulse but will not convert the amplitude of the fourth pulse. Yet an additional reason for not converting the amplitude of the fourth overlapped pulse is that a portion of its amplitude is attributable to that of the third pulse which would render a false value for the amplitude of the fourth-occurring gamma ray.

Referring further to the wave forms D of FIG. 10, a "data ready" signal will also desirably be generated in the pulse height analyzer 62 upon completion of conversion to digital form of the pulse height values of the pulses in the signal input 17. In other words, the start conversion pulse will trigger an analog to digital converter to convert the peak stored values of the selected input pulses in the signal input, such conversion time typically taking 1.5 microseconds. After conclusion of this conversion time dictated by the particular A-to-D converter employed, the converted value will thus be available out of the converter in digital form for storage in the accumulator 60, and availability of this data may therefore be indicated by the data ready signal in wave form D. Also with reference to wave forms D in FIG. 10, anytime the analog value of the input signal 17 falls below the LLD value, it is desirable to reset the pulse height analyzer 62 so that it may begin again tracking the input signal to determine when it is between the ULD-LLD range and when a peak has occurred. Thus, a reset signal is desirably generated by comparing the signal input level to the LLD level such that when the signal input level falls below the LLD level, as schematically indicated by comparison between the signal input and LLD levels of wave form A and the reset pulse of wave form D, the reset pulses are generated.

In summary, with respect to the overall operation of the pulse height analyzer 62, it is desirable to provide circuitry for tracking the level of the input signal 17 and holding it at the occurrence of peak values of the pulses in the input signal. Moreover, with respect to overlapping pulses wherein the aforementioned pulse-pileup problem occurs, it is desirable to hold this analog value at the peak of the first of such overlapping pulses. Finally, with respect to values held by a sample and hold circuit, it is desirable to convert these analog values to digital forms only when the peak held value is held within the desired ULD-LLD range.

Comparison of wave forms C in FIG. 10 relative to the input signal of wave form A indicates that wave form A has the aforementioned desirable properties of an analog signal to be presented to an A-to-D converter. This comparison reveals that the ADC input will track the varying analog level of the input signal 17. However, when the peak of the input signal 17 is reached, this peak value will be held until the analog value of the input signal drops below the LLD threshold level. Moreover, comparison of the ADC input signal of wave form C corresponding to the third and fourth pulses of the input signal of wave form A indicates that the peak value of only the third pulse is held in the ADC input and that the ADC input does not thereafter increase to the peak of the fourth pulse due to the aforementioned overlapping between the third and fourth pulses. Next, a comparison of the ADC input of wave form C to the start conversion pulse in wave form D should be made. Peak values for the pulses in the input signal 17 will be held as indicated by the ADC input even when the input pulses are below the LLD threshold or above the ULD threshold, as in the case of the first and fifth pulses in the input signal 17. However, due to the input limitations on an A-to-D converter, as aforementioned, it is desirable only to convert the held maximum value of the pulses occurring within the LLD-ULD range. Thus, it will be noted that start conversion pulses occur for the held peak values of the pulses, but only for those input pulses whose peaks are within the LLD-ULD range. In this manner, only those values for the ADC input signal occurring simultaneously with the start conversion pulse will be converted to digital form to avoid converting peak held values for input pulses exceeding the LLD-ULD range.

Figure 9:
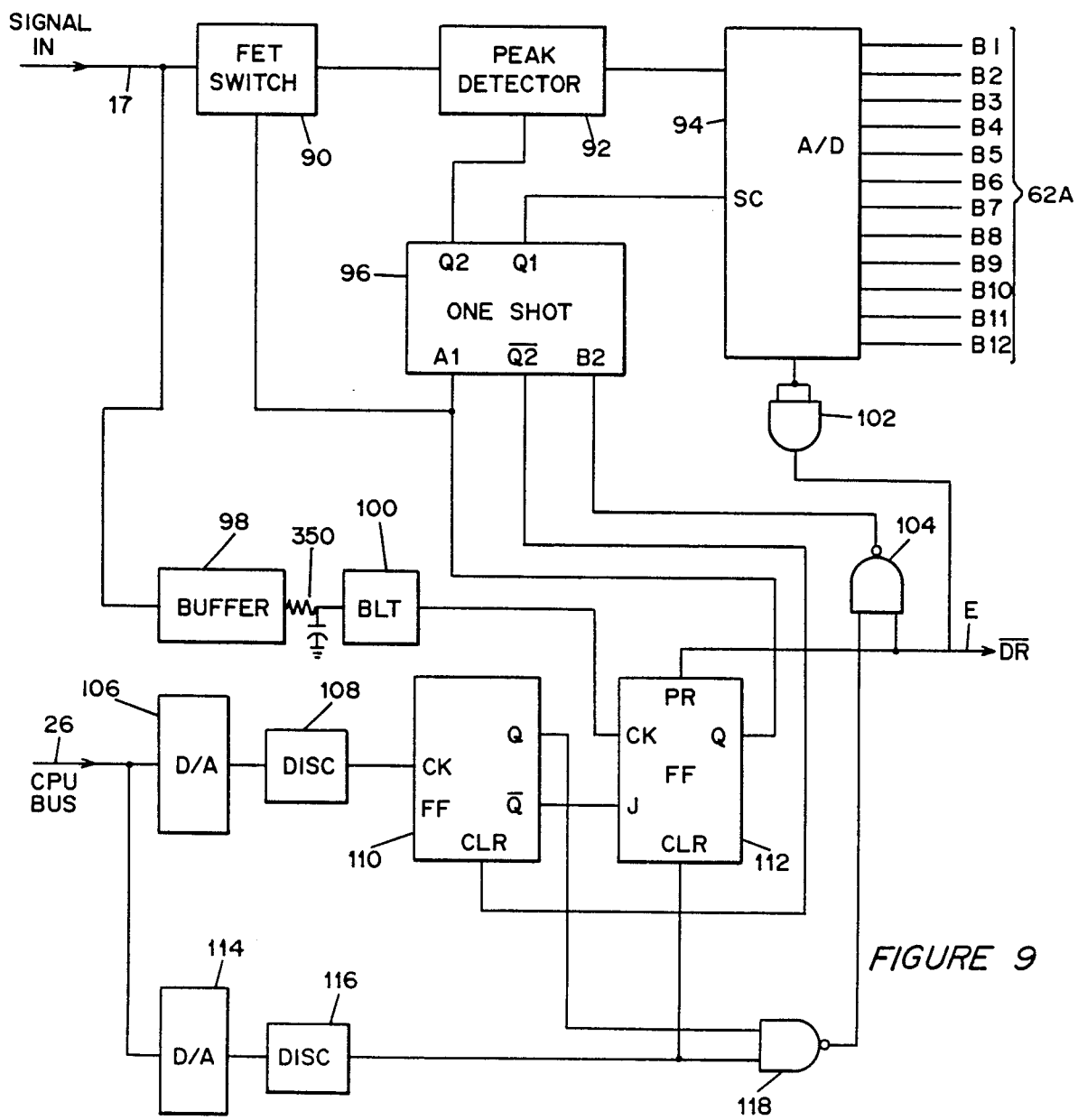
FIG. 9 is a schematic diagram of the pulse height analyzer circuitry of FIG. 5.

Now that a general explanation of the desired characteristics of a pulse height analyzer 62 and its overall operation have been given, reference may now be made to the schematic block diagram of an implementation of such a pulse height analyzer of PHA with reference to FIG. 9. Comparison of FIGS. 5 and 9 indicate that the analog input signal corresponding to detected gamma rays is delivered on line 17 to a fet switch 90. This analog input will, at appropriate times, be delivered through the fet switch 90 to the peak detector 92. Detector 92 is basically a voltage follower which follows the analog input holding appropriate peak values thereof in response to the Q2 output of one shot 96 delivered to the detector 92. The output of detector 92 will accordingly correspond to the ADC input in wave form C of FIG. 10 which will be delivered to the input terminals of an appropriate A/D converter 94. When the A/D converter 94 receives a start conversion or SC pulse (corresponding to the start conversion pulses of wave form D in FIG. 10 and the Q1 output of one shot 96), the A/D converter 94 will convert these analog inputs out of peak detector 92 delivered to the input of A/D converter 94 at occurrence of each SC pulse. This, in turn, will result in a twelve bit digital word 62A corresponding to the value of the analog input (the flat portions of the ADC input of wave form C). Reference to FIG. 5 will show that this digital version of the peak of the analog gamma ray pulse will be delivered to the multiplexer 56 from the PHA 62 for ultimate storage as part of the accumulated spectra in the accumulator 60.

The main purposes of the balance of the circuitry depicted in FIG. 9 are as follows. First, the peak detector 92 must be reset to follow subsequent incoming analog signals from the fet switch 90 any time the current input signal falls below the baseline threshold. Secondly, the input to the peak detector 92 must be inhibited from receiving inputs and thus following any analog signal corresponding to pulses which overlap a preceeding pulse such as the fourth pulse overlapping the third pulse in the input signal in wave form A in FIG. 10. This explains the presence of the fet switch 90 so as to isolate the input signal 17 from the peak detector 92 upon occurrence of this overlapping pulse so that the peak detector 92 holds the peak value of the third pulse as shown in the third plateau of the ADC input in wave form C of FIG. 10. Also, this remaining circuitry of PHA 62 in FIG. 9 is necessary to generate the start conversion or SC pulse so as to instruct the A/D converter 94 when to convert the held peak value in the peak detector 92. As aforesaid, this instruction to A/D converter 94 must not be provided when the stored and held value of the peak detector 92 is outside the LLD-ULD range, explaining absence of the SC pulse in wave form D for the first and fourth plateaus of the ADC signal in wave form C. There is yet an additional function performed by the balance of the circuitry in FIG. 9 relative to the previously described LLD, ULD, and baseline thresholds. It will be recalled that a feature of the invention is to provide for adjustment of such thresholds as desired under computer control, whether by downhole CPU 24 or in response to commands to the downhole system sent through cable 20. The CPU bus 26 will interconnect to PHA 62, and, more particularly, to a pair of digital to analog converters 106 and 114. A digital word corresponding to the ULD value will be delivered on the CPU bus 26 to D/A converter 106 for conversion to analog form and delivery to a ULD discriminator 108. Similarly, a digital value delivered on bus 26 to the LLD D/A converter 114 will be converted into analog form and delivered to LLD discriminator 116. The input signal 17 will be routed to a buffer 98, the output of which is delivered to discriminators 108 and 116. These discriminators will compare the analog input signal 17 to the corresponding analog value delivered to the discriminators by their respective D/A converters. In other words, discriminator 108 will compare the analog input signal 17 to the analog value for the ULD threshold delivered by D/A converter 106 to the discriminator 108. It will be recalled this value, which may be selected at will be delivery of a corresponding digital word on CPU bus 26 to converter 106, will be converted by converter 106 to analog form. In like manner, discriminator 116 will compare the analog input signal 17 to the analog value supplied by D/A converter 114 which corresponds to the LLD threshold. This analog LLD threshold will, in like manner, be created by the conversion in converter 114 of the corresponding digital LLD threshold word 26 delivered to converter 114. Outputs from ULD and LLD discriminators 108 and 116, respectively, will accordingly occur when the input signal 17 exceeds or falls below the ULD and LLD threshold levels delivered to discriminators 108 and 116, respectively, by their corresponding D/A converters 106 and 114.

It will further be noted that the output of buffer 98 will also be delivered to a differentiator circuit 350 for purposes of detecting the peaks of the input signals 17. Thus, spikes will be generated at occurrence of the input signal peaks having amplitudes corresponding to the amplitude of the input signal peaks. These peak spikes will be passed through a baseline discriminator 100 such that outputs from the baseline threshold discriminator 100 will occur upon occurrence of signal input peaks and only when the amplitude of such peaks exceeds the selected baseline threshold. The falling edge of the peak detect signal out of the baseline threshold detector 100 will clock the Q output of a flip flop 112 high. This Q output is delivered to the aforementioned switch 90 and the one shot 96 turning the switch 90 off. In this manner, further analog input into the peak detector 92 will be prevented. Referring back to FIG. 10, this may be seen with reference to the third and fourth pulses in wave form A as compared with wave form C wherein the peak value of the third pulse is held by the peak detector 92. The analog value corresponding to the fourth peak is thus prevented from passing through the switch 90 to be followed by the peak detector 92, as evidenced by the fact that the third plateau of the ADC input in wave form C remains flat through the time of occurrence of the fourth pulse. The Q output of flip flop 112, in being routed to the A1 input of one shot 96, also causes this one shot 96 to fire generating an output Q1 which is delivered to the A/D converter 94. This Q1 output may be recognized as the start conversion or SC command pulse in wave form D causing conversion of the plateau peak being currently held by the detector 92 into digital form by the A/D converter 94. The A/D converter 94 includes an output indicating a time interval from occurrence of the start of its conversion process to its completion. During this conversion time, data will thus not be available on the converter output 62A for storage. However, after the conversion time necessary to convert the analog input to the converter 94 into digital form, the digital output will be available on the B1-B12 outputs 62A for storage. This signal indicating whether data is ready on the output 62A of the converter 94 is referred to as the data ready or DR signal which, upon inversion by the NAND gate 102, is available as a "data not ready" or $\overline{DR}$ signal E.

Referring back to FIG. 5, this signal E is delivered from the PHA 62 to the control circuitry 64. In this manner, the control circuitry 64 will only generate store commands such as F and G for delivery to multiplexer 56 after the A/D converter 94 has had the appropriate amount of time to convert the analog level corresponding to the detected gamma ray, whether it occurs during the inelastic or capture gate. Because gamma rays are detected during both the inelastic and capture windows and converted during these times, data will be ready for the multiplexer 56 as well as storage in the accumulator 60 during both of these windows, thus explaining the data ready signal for its inversion being high as shown in FIG. 6 at two distinct times. It will be noted that the one shot 96 is further provided with an enable input B2. This input B2 results from a NAND by gate 118 of the outputs of discriminators 108 and 116, and a further NAND of this output of gate 118 with the $\overline{DR}$ by NAND gate 104. Thus, the one shot 96 will only be triggered, based upon the enable inputs A1 and B2 as described, the analog level on input signal 17 being followed by detector 92 is between the LLD and ULD thresholds corresponding to discriminators 108 and 116 and further only when a signal out of baseline threshold 100 indicates that a peak is present on the input signal 17 exceeding the baseline threshold.

In summary then, regarding the operation of PHA 62, when a valid analog data pulse appears on the input signal line 17, the peak detect signal out of baseline threshold 100 indicates that a peak value is present on the input line 17, exceeding the baseline threshold, thus triggering flip flop 112. The Q output of flip flop 112, in turn, shuts off switch 90 to prevent further analog input into the detector 92. This Q output is delivered to input A1 of the one shot 96 indicating the aforementioned presence of a peak value above the threshold. Provided that the peak value is within the ULD and LLD levels, as detected by discriminators 108 and 116, and further provided the converter 94 is not presently converting an analog value as indicated by the $\overline{DR}$ signal, this status will be indicated to the one shot 96 by the B2 input resulting in firing of the one shot 96 and conversion of the peak stored in the detector 92 by the converter 94. When the conversion is completed by the converter 94, the $\overline{DR}$ signal goes high which is delivered to the preset input of the flip flop 112. The purpose of this is so that when the converter 94 is doing a conversion, the preset input into flip flop 112 presets the flip flop so that it is disabled so long as a conversion is being performed by the converter 94. When the LLD discriminator 116 output goes low resulting in a high level out of gate 118 and when the preset of flip flop 112 or $\overline{DR}$ is also high indicating a conversion is taking place, the Q2 output of one shot 96 thereby provides a reset pulse to the peak detector 92 to clear the peak value stored in the detector 92. Also at this time the $\overline{Q2}$ goes high resetting the clear line of the lip flop 110, e.g., resetting the function of the ULD discriminator 108. The circuitry is thus reset and ready to receive a next valid pulse.

Figure 11:
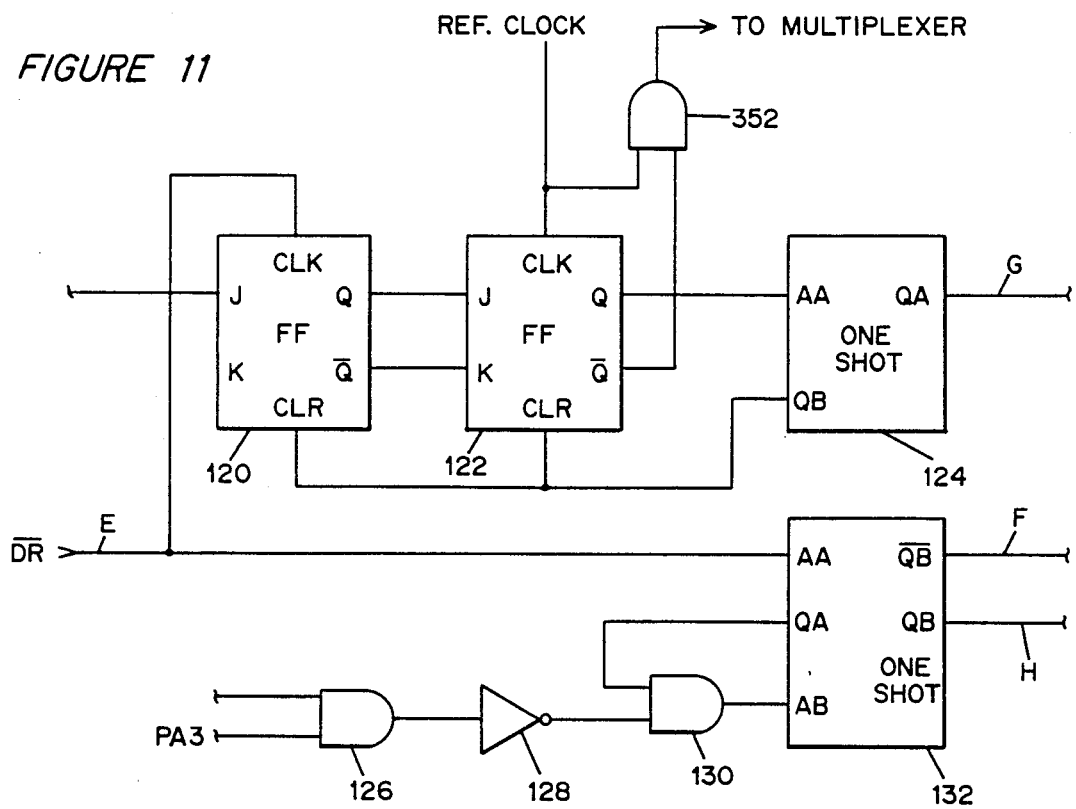
FIG. 11 is a schematic diagram of the timing and gating circuitry of FIG. 5.

A more detailed description of an implementation of the timing and gating control functions provided by the control 64 will now be given with reference to FIG. 11. Two flip flops 120 and 122 may be arranged in cascade whereby the Q output of flip flop 122 is provided to the trigger input of a one shot multivibrator 124. It will be noted that the aforementioned reference clock may be provided to the clock input of the flip flop 122 so that it toggles at a rate corresponding to the selected time windows such as the 200 nanosecond windows previously described. Toggling at this rate will also fire the one shot 124 during each occurrence of one of the windows causing the $\overline{QB}$ output of one shot 124 to go low and the QA output to go high, thus generating the previously described pulse arrival time store pulse G which is delivered to the multiplexer 56. The purpose of this pulse train G is to instruct the multiplexer 56 as to each time a new successive address code corresponding to a new time window is being presented on line 52A to the multiplexer 56. Each time the $\overline{QB}$ output of one shot 124 goes low, the $\overline{Q}$ output of flip flop 122 also goes low. This Q output flip flop 122 is anded with the reference clock by AND gate 352, the output of which is routed to the multiplexer 56 instructing it to deliver a store pulse I to the buffer 58 whereby the address code currently residing on the bus 52A may be passed through the multiplexer 56 and latched into the buffer 58. In summary, when it is required to store a pulse arrival time, the multiplexer 56 must be instructed as to the fact that a time to store occurrence of a pulse arrival is present, e.g., a new address code corresponding to a different time window is present on line 52A to be latched by buffer 58 and the pulse height data on line 62A is not to be passed through the multiplexer 56 to the buffer 58. Moreover, the multiplexer 56 in addition to being provided with an indication that it is time to receive an address code, must further receive a command instruction to have the value of the particular address code latched by the buffer 58, as indicated by the $\overline{Q}$ output of flip flop 122.

As previously noted, it is at times desirable to provide a gated pulse height arrival store pulse so that the function of storing pulse height data may be selectively enabled or deactivated as desired. This may be accomplished by means of gating on or off the pulse height store pulse under control of an enabling pulse from the CPU 24. Accordingly, input on the CPU bus 26 indicating whether a pulse height store pulse is to be enabled or gated on or off is delivered through AND gate 126, and inverter 128 to AND gate 130. By varying the input on the CPU bus 26 to the gate 126 the QB and $\overline{QB}$ outputs corresponding to wave forms H and F in FIG. 6 may be gated in response to CPU 24 control as desired.

A preferred embodiment of the buffer 58 portion of the multi-parameter analyzer 22 will now be described in greater detail with reference to FIG. 12. The buffer 58 is preferably of a high speed first in - first out or FIFO type. It is a significant feature of the presently described system that the memory in accumulator 60 which accumulates the desired energy and time spectra may be accessed both by the CPU 24 as well as by the remaining portions of the multi-parameter analyzer 22. If this memory was, at a given time, being accessed by the CPU 24 data acquisition by the multi-parameter analyzer 22 would thus be impeded reducing throughput of the system, inasmuch as the data acquisition capability of the analyzer 22 would have to be held in abeyance until the CPU 24 relinquishes control of the memory. Otherwise, data values being generated by the analyzer 22 would be lost during CPU 24 control of the memory inasmuch as this data would have nowhere to be stored. Accordingly, one of the functions of the buffer 54 is to provide temporary storage for the data being derived by the rest of the analyzer 22 until such time that this data can be stored in the appropriate memory locations in the memory of accumulator 60 corresponding to the various spectra being accumulated.

Figure 12:
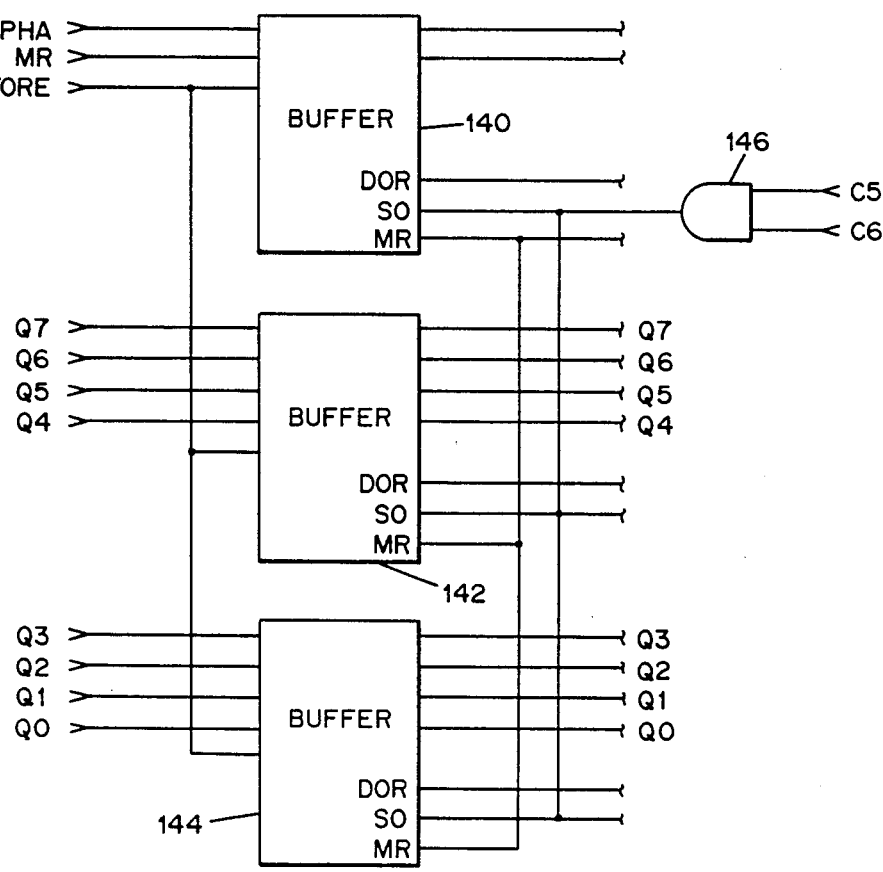
FIG. 12 is a schematic diagram of the buffer circuitry of FIG. 5.

Referring now to the buffer 58 as depicted in FIG. 12, this function may be conveniently provided in the form of three buffer chips 140, 142, and 144. Inputs Q0–Q7 to buffers 142 and 144 may be recognized as 8-bit time or energy data received from the multiplexer output data bus 56A, as shown in FIG. 5. In like manner, buffer 142 and 144 outputs Q0–Q7, recognized as 8-bit time or energy data, pass through the buffer 58 and are delivered to tri-state buffer 170 of accumulator 60 (to be discussed in greater detail) as output 58A. Similarly, the inputs to buffer 140 may be recognized as signals I (58B), C (corresponding to signals 56C and 58D), and F (corresponding to signals 56B and 58C). Also in like manner, the outputs of buffer 140 are also delivered to a tri-state buffer 168 of accumulator 60 to be described in greater detail. In general then, a preferred arrangement for the buffer 58 is such that the first buffer 140 temporarily stores and passes to the accumulator 60 command signals corresponding to signals F, C, and I, indicating whether the data present on lines 56A and 58A occur during the inelastic or capture window, whether they are pulse arrival or pulse height data, and whether the system is presently in the inelastic or capture windows. The buffers 142 and 144 on the other hand, are for purposes of temporary storage of the actual time or energy data to be accumulated by the accumulator 60. A DOR signal is also received from each buffer 140, 142, and 144, which is anded together in the accumulator 60 in a manner to be described. Basically, the purpose of this signal is for synchronization purposes to insure that data is not retrieved from the buffers 140, 142, and 144, until the information is available simultaneously in all such buffers. Finally, a shift data out signal (C5 and C6) from accumulator 60 is anded by gate 146 and delivered to the shift out or SO ports of buffers 140, 142, and 144. In response to the C5 and C6 signals from the accumulator 60, generated at appropriate times to be described, the stored data in buffers 140, 142, and 144 will be shifted out on bus 58A and the output of buffer 142 to respective buffers 170 and 168 in the accumulator 60.

Each time a store pulse I is presented to the buffer 58, data is stored therein which cycles through the buffer 58 in a first in - first out manner. Each chip of the buffer has a data out ready or DOR output which will go high when there is presence of data to be cycled out of the buffer. The DOR signals from each buffer chip will be delivered to AND gates 150 and 162 of the accumulator 60. Due to propagation of data through the buffer chips 140, 142, and 144 of the buffer 58 at different rates, the purpose of this DOR signal is to insure that data is availabe for output on all three FIFO buffers of buffer 58 before cycling this data out. When this has occurred, the output of gate 150 will go high. It will be noted that a peripheral interface adapter output PB0 from the CPU 24 will be delivered through gate 152 to the input of a flip flop 154. This output of the CPU 24 will indicate whether an accumulation is being done by the accumulator 60 or, in the alternative, whether the system is waiting for an accumulation. In other words, a high output out of gate 152 indicates that data is available on the output of buffer 58 and that, in response to the PB0 command from CPU 24, it is desirable to do an accumulation of this data.

A counter 156 is provided in the accumulator 60 having the aforementioned 5 MHz clock wave form input therein which provides a time base for the instruction cycle for the circuitry of accumulator 60. This counter 156 is enabled by the Q output of flip flop 154 when the aforementioned conditions are met, e.g., when the PB0 output of CPU 24 indicates an accumulation is desired and when the DOR output of buffer 58 indicate that data is available. Upon occurrence of this condition, the Q output of 154 enables the counter 156 so that it begins counting at a rate corresponding to the 5 MHz clock input Q. The output of counter 156 is delivered to a 3:8 decoder 158 which has successive outputs C0–C7. Due to the decoding function of counter 158, on each successive clocking of the counter 156, each successive C0–C7 output of counter 158 will go high. Each such output C0–C7 is used as a sequencer to cause various components in the accumulator 60 to be activated sequentially in a manner to be described. For illustrative purposes, it will be assumed that a gamma ray having an energy level of 2.2 Mev has just been detected. It is therefore desirable to increment the accumulated count by one which is stored in the memory location in memory 180 corresponding to counts of gamma rays occurring within an energy window including the 2.2 Mev level. It will further be assumed that due to appropriate address and control information being provided to the memory 180 by the buffers 168, 170 and 172 in a manner to be described, the 8-bit count for this energy window is present on the output of memory 180. The C0 command from counter 158 is a load command delivered to counters 190 and 192 instructing them to load the output of memory 180 (whether a pulse height time or energy value) into the counters 190 and 192. The memory 180 serves merely as an accumulator to maintain the current count of gamma rays in each time or energy window.

After such loading in response to the C0 command, the C1 command will next be generated by the counter 158, which is also delivered to counter 192 causing the count thus stored in counters 190 and 192 to be incremented by one. Thus, if the count stored in counters 190–192 was three corresponding to occurrence up until now of three gamma rays in the 2.2 Mev range, the count now resident in counters 190–192 in response to the C1 command will now be four. Next, the C2 command will be generated from counter 158 which is delivered to buffer 194 and causes the buffer to deliver the new updated count value out of the outputs of counters 190–192, through buffer 194, and back into memory 180 in the same memory location that the previous count was stored in. Next, the C3 command is generated by counter 158. This command is a carry output in the event the previous incrementing of counters 190–192 results in an overflow as communicated to flip flop 188 by counter 190. If this condition occurs, presence of the C3 command of the clock input of flip flop 186 and the Q output of 188 on the J input of flip flop 186 causes an output of flip flop 186 to be delivered to gate 166. Next, counter 158 generates a C4 command which is a query as to whether or not a carry situation exists. In other words, the C4 command checks for this condition via gate 166. If a carry exists, gate 164 resets the counter 156 which causes a recycling back to the C0 command. This also causes a change in the address lines to the counters 190–192 so that counter 192 starts incrementing as opposed to counter 190. Due to the presence of two 8-bit counters 190 and 192, it is thus possible to accumulate up to 65,000 counts per channel (either an enery or time window) since a 16-bit incrementer is thus provided.

Next, the C5 and C6 commands are generated. Referring back to FIG. 12 it will be recalled that these commands are anded together in gate 146 to generate a shift out or SO command to the buffers 140, 142, and 144 This shift out command thus occurs after the incrementing step wherein a previous memory location in memory 180 has been incremented. Thus, during the presence of the SO command to the high speed buffer 58, the buffer 58 is commanded to shift out the most recently received data on bus 58A to the accumulator 60. During this time the DOR signal is low, however, if additional data is ready after shifting out the prior data, the DOR signal goes high again and the shifting cycles are repeated. Next, the C7 command is generated by counter 158 and delivered through AND gate 164 to the clear input of counter 156 to reset it. Thus, the counter 156 may be reset in two ways, either when an increment cycle through C0-C7 of counter 158 is completed or, in the alternative, if a carry situation exists with respect to counters 190 and 192.

The data provided on inputs Q0-Q7 carry address information concerning which channel in memory 180 to be incremented. As previously mentioned, in one embodiment 256 channels may be available for accumulating each of three spectra: the inelastic, capture, and time-distribution spectra. It has been found that 2-kilobits of memory in memory 180 are sufficient for most applications wherein it is desirable to simultaneously accumulate capture, inelastic, and time-distribution spectra, 512 bits being reserved for each spectrum. It will be recalled that with 16-bit data to provide for up to 65,000 counts per channel, this corresponds to 2-bits per channel, or in other words, with 256 channels of 2-bit data, 512 bits per spectrum.

In summary then, the sequential operation of the accumulator 60 is as follows. During cycle C0, a current count is retrieved from memory 180 for the particular channel addressed to the memory 180, whether it be one of the 256 channels of inelastic, capture, or time-distribution spectra. This count data is taken from memory 180 and loaded in counters 190-192. During command C1, the counters 190 and 192 increment. During command C2, a write cycle is performed writing the incremented count through buffer 194 back into the memory location in memory 180. At command C3, a carry is performed wherein if the prior count in counter 190 is 255, a carry flag is set. During command C4, a carry check is performed by gate 166, and if the carry flag is set, the chip address increments by one, addressing chip 192 and the counter 158 is reset to C0, where upon a new cycle is performed incrementing the counter 192. During command C5-C6, shift out or SO signal is provided to the FIFO buffer 58 causing a shift out of data on the end of the buffer 58, and finally, during C7, the sequencer or counter 158 is reset.

Figure 13:
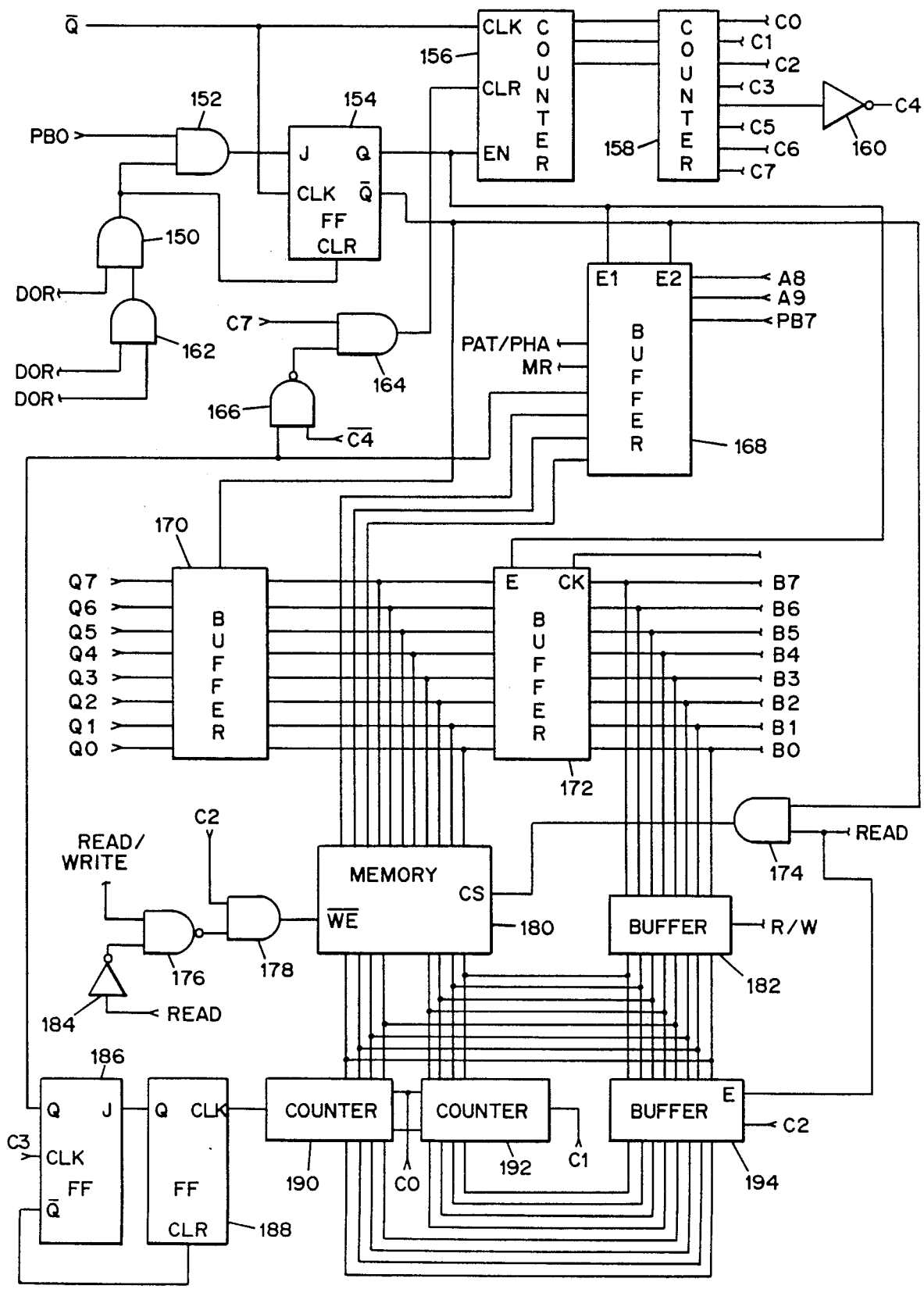
FIG. 13 is a schematic diagram of the accummulator circuitry of FIG. 5.

The buffers 168, 170, and 172 of FIG. 13 will now be discussed in greater detail. It will be recalled that a feature of the system being described is that all three spectra, the inelastic, capture, and time-distribution, are accumulated by accumulator 60 in one memory simultaneously and automatically. Moreover, this memory 180 may be shared by two devices, namely the components of the multi-parameter analyzer 22 including the accumulator 60 as well as the CPU 24 itself. These other components have access to the memory by means of buses such as 58A and 58B, whereas the CPU 24 has access to the memory via a direct memory access or DMA bus 26. Thus, the buffer 172 may be seen to serve as an address bus buffer having an output which corresponds and is routed to the DMA address bus to the CPU 26. The buffer 182 is an 8-bit bi-directional tri-state bus transceiver tied to the DMA address bus 26. When it is desirable for the CPU 24 to obtain access to data in the accumulator 60, this bus acts as a memory chip, permitting either a read from or write to the memory 180 without causing a previously-described incrementing cycle. The buffer 172 serves as an address buffer so as to permit addressing by means of the DMA bus 26, the desired memory locations in memory 180.

Figure 14:
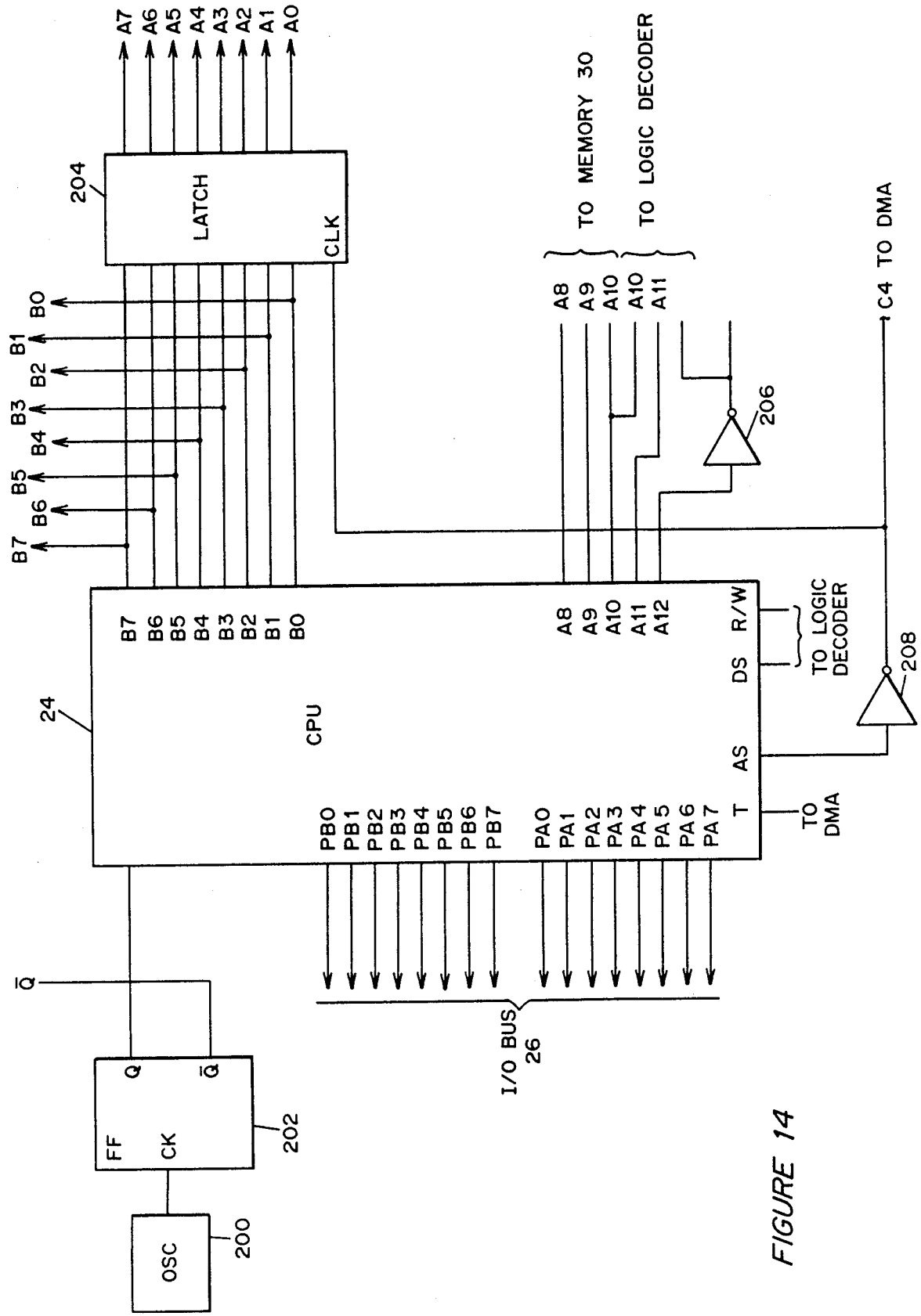
FIG. 14 is a schematic diagram of the central processor unit portion of the circuitry of FIG. 5.
Figure 16:
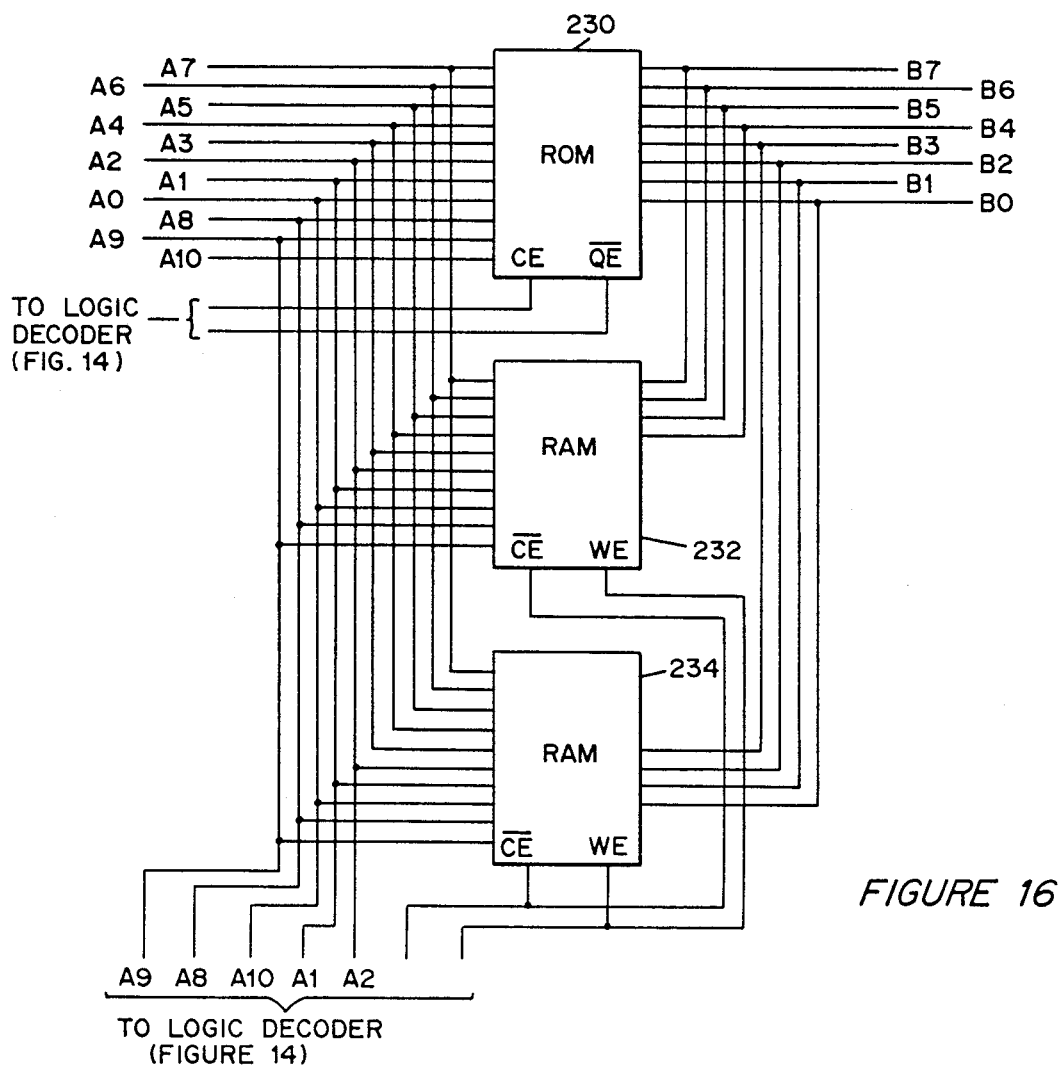
FIG. 16 is a schematic diagram of the memory circuitry of FIG. 5.

Turning now to the CPU 24 portion of the multi-parameter analyzer 22, in more detail a schematic diagram thereof may be seen in FIG. 14. This CPU 24 will be discussed in conjunction with a more detailed schematic diagram of the memory 30 as shown in FIG. 16. As in a conventional microprocessor based system, the memory 30 will be comprised of read only memory 230 as well as random access memory 232 and 234. The CPU 24 is provided with ports B0-B7 which are interconnected to the ROM and RAMs 232 and 234 for purposes of serving as data and lower order address lines to the memory 30. A latch 204 is provided to the CPU 24 for purposes of storing these B0-B7 address codes for use at a later time, the stored equivalent of which are referred to as address lines A0-A7 which are, in like manner, delivered from the latch 204 to the ROM 230 and RAMs 232 and 234. The CPU 24, in addition, includes address ports A8-A10, which are also delivered to the ROM 230 and RAMS 232 and 234. In this manner, the CPU 24 may address memory locations in the memory 30 for storage or retrieval of data or program steps in a conventional manner. Referring to FIG. 14, the CPU 24 will additionally include 14 input-output ports PB0-PB7 and PA0-PA7 for purposes of addressing and accessing selected devices, chips, and the like via the CPU I/O bus 26 and, accordingly, these ports will be connected to the bus 26 in a conventional manner such as through a peripheral interface adapter or the like when required. An oscillator 200 which clocks a flip flop 202 serves to provide the machine cycle for the CPU 24. Additional outputs of the CPU 24 and their functions will be discussed hereinafter with reference to other portions of the circuitry depicted herein.

Figure 15:
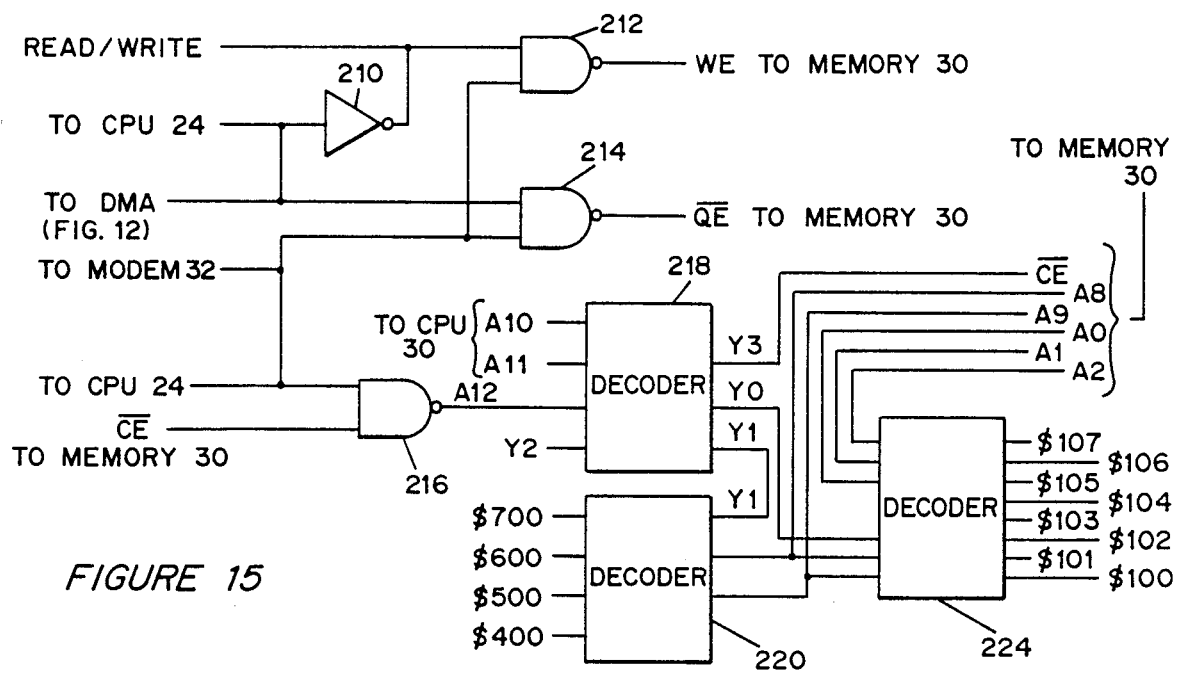
FIG. 15 is a schematic diagram of the logic decoder portion of the central processor circuitry of FIG. 5.

The twelve address lines B0-B7 and AS-A12 of the CPU 24 allow for accessing of up to 8,000 bits of data. The programmable input/output ports PB0-PB7 and PA0-PA7 employed with a PIA are single control lines which may be brought high or low for purposes of controlling various devices in the system in a conventional manner. For example, these ports may be used to control the modem 32 to transmit or receive or may be used to enable reading of various lines throughout the system. It will be appreciated that when addresses are available as, for example, on line 52A to the multiplexer 56 or, for example, when addresses are provided on outputs B0-B7 and A8-A12 of the CPU 24, it will be necessary to decode these addresses in order to obtain chip select or enable signals to translate address codes to the particular devices to be addressed. This is done in a conventional manner through logic decoding circuitry such as that indicated in schematic block diagram form in FIG. 15. Each device in the system will have its own unique device address which may be scheduled in a memory map so that for every address input into the logic decoding circuitry, an appropriate combination of signals will be output enabling the appropriate devices. Thus, the logging system of the present invention will be provided with such logic decoding (not shown in FIG. 5).

Referring now to FIG. 17, the modem 32 portion of the system depicted in FIG. 1 will be described in greater detail. The fundamental purpose of the modem 32 is to convert 8 or 16-bit serial data received from the surface on cable 20 into parallel form for use by the instrument 12 and, conversely, to convert such parallel digital information into serial digital code for transmission to the surface on cable 20. For these purposes a parallel to serial shift register 242 and serial to parallel shift register 244 are provided in the conventional manner in addition to an encoder/decoder 254. Input to and output from the shift registers 242 and 244, indicated as B0–B7, will be interconnected to the CPU bus 26. The cable 20 will in turn be connected to appropriate digital receiver and transmitter circuitry 256 and 258 which are well known in the art and will include appropriate signal conditioning, amplification, and the like. When in the receive mode, serial digital data delivered by the cable 20 will be delivered to the receiver 256 and thence to the encoder/decoder 254 wherein the information will be decoded. This serial data will thence be transferred to the serial to parallel shift register 242 and thence out on the CPU bus 26 to the CPU 24. When information is present on the CPU bus 26 for transmission to the surface, this data will be delivered on bus 26 to the parallel to serial converter 244, and thence to the encoder/decoder 254 wherein it will be encoded and thence delivered to the transmitter 258. Transmitter 258 will appropriately amplify and condition the encoded serial data into proper form for delivery on the cable 20 to the surface.

The automatic gain control feature shown schematically as block 34 in the instrument 12 in FIG. 1 will now be discussed in greater detail with reference to FIG. 18.

The automatic gain control feature of the instrument 12 will now be discussed in greater detail. Referring to FIG. 1, it will be recalled that a gain control circuit 34 is provided which is responsive to control signals on the CPU bus 28 and which generates control signals in response thereto to adjust the gain of the detector 14. Reasons for providing such a system are numerous. As one example, the voltage pulses generated by the photomultiplier tube in the detector 14 typically have extremely high rise times on the order of 50–100 nanoseconds and are of relatively small magnitudes. The analyzer 22 is provided with analog amplitude and signal shaping circuitry which conditions the voltage pulses delivered on line 17 from the detector 14. However, it is difficult to provide an active circuit which can follow pules having the short rise times and low magnitudes without adding distortion and undesirable components. Accordingly, it was further desirable to provide means for using DC levels to change gain without introducing the aforementioned distortion of pulses and for improving signal to noise ratios. Yet an additional reason for desirably shifting the gain of the detector relates to the spectral analysis being performed. Frequently, it is desirable to adjust gain in order to spread the various spectra over a desired range or number of channels, and to shift such gain by a known amount or energy for each channel.

Thus, referring to FIG. 18 in greater detail, which is a schematic block diagram of a gain control circuit of the present invention, the gain control 34 will be provided with a digital to analog converter 270 which receives data and control signals on CPU bus 28 from CPU 24. In particular, the signals will include a digital representation of a desired discrete gain level at which the detector 14 is to operate. These digital representations may thus be changed at will under control of the CPU 24 so as to discretely change the gain of the detector 14.

Upon conversion of these digital gain control words into analog form by converter 270, the analog version thereof is provided to a buffer 272 which may comprise an operational amplifier which generates a discrete constant voltage reference output in response to these analog control levels input into the buffer 272. The converter 270 is preferably a 12-bit converter such that 4,096 discrete voltage steps may be provided to vary the detector gain 14 by a correlative amount. The reference voltage out of the buffer 272 is thence delivered to a voltage regulator 274 which energizes a step up power transformer 276, the secondary of which, as indicated schematically by high voltage supply block 278 provides the high voltage supply to the photomultiplier tube within the detector 14. A feedback 270c between the high voltage supply 278 and the regulator 274 serves to provide a constant high voltage output independent of load and temperature variations and the like functionally related to the reference voltage input into the regulator 274. From the foregoing, it will thus be appreciated that an analog high voltage output 278 supplied to the photomultiplier tube of detector 14 will be provided which varies in discrete analog steps in direct correlation to the variable digital gain control words supplied to the converter 270 in predetermined steps. Due to the physical operation of such photomultiplier tubes, the high voltage supply 278 thereto will vary the gain of the photomultiplier tube and thus the gain provided to the detected gamma ray analog voltage pulses in the desired manner.

Figure 19:
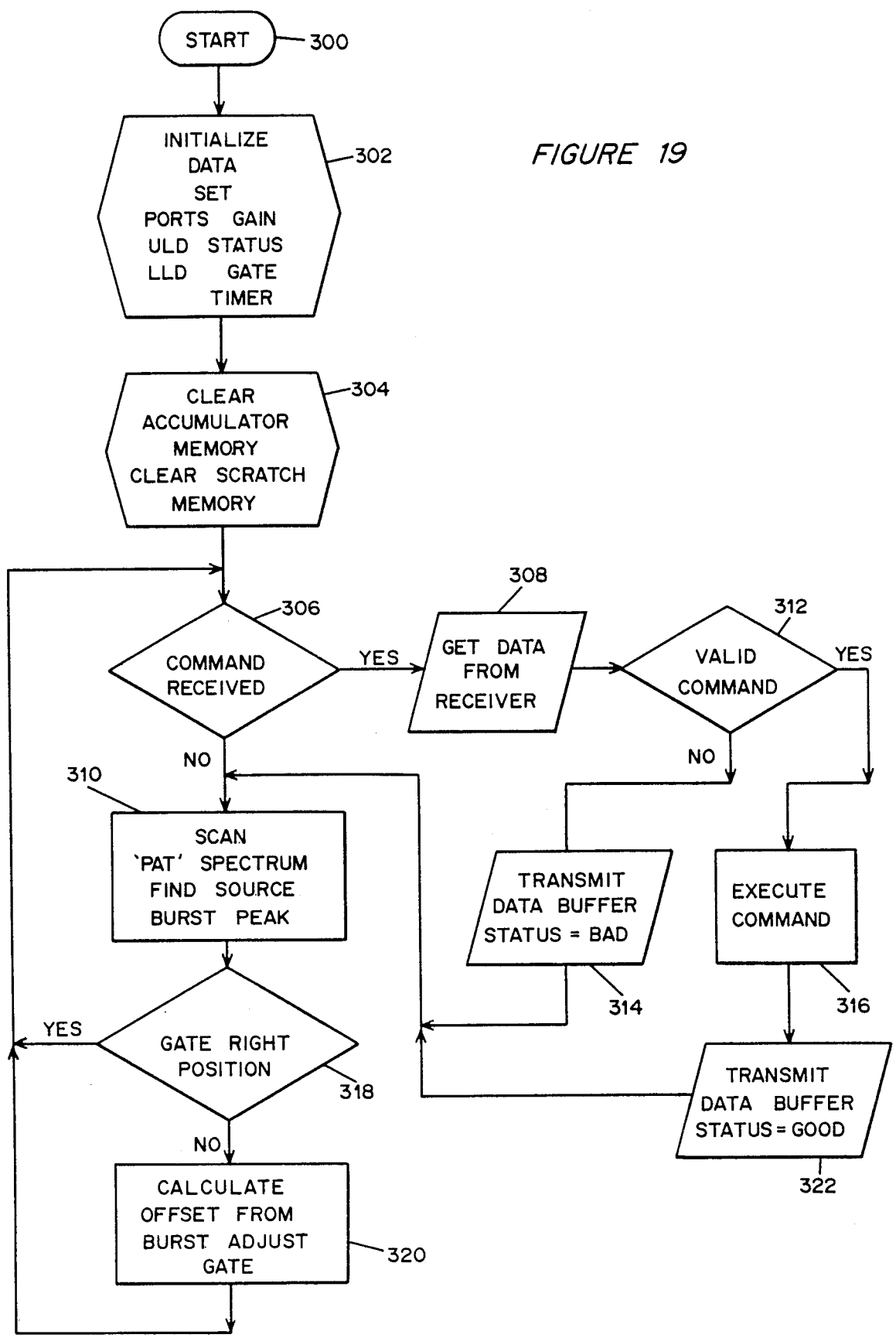
FIG. 19 is a flow chart of a program routine executed by the central processing unit for obtaining data in the data analysis mode of system operation.

The overall sequential system operation of the logging system depicted in FIG. 1 will now be described in greater detail with reference to FIG. 19. The feature of the nuclear well logging system of the present invention is that in addition to simultaneously generating a plurality of downhole spectra, the system including the parameters related to such spectra are under control of a downhole microprocessor based system contained within the instrument 12 as well as, in the alternative, being under control of a master controller 33 located at the surface. FIG. 19 is intended to schematically represent in block diagram form a flow diagram of the computer system represented by CPU 24 in memory 30 whereby the various operating steps of the system are controlled.

More particularly, prior to commencing a logging operation, a system control program and initializing data will be downloaded via cable 20 from the master controller 33 to the CPU 24 and stored in memory. In addition to the logging operation software, at this time parameter values will be downloaded which are necessary for operation of the system and may include, for example, the desired gain at which the detector 14 will operate, length of gates for the inelastic and capture gamma ray windows, threshold such as the upper level and lower level discriminator values ULD and LLD, baseline threshold values, the type of spectra to be generated (e.g., inelastic, capture, and/or time-distribution spectra), and the like. These parameters may, of course, be selectively adjusted during a logging operation as desired, however, this initialization step will typically be performed prior to commencing a logging operation.

Once this data has been stored in memory 30, the logging operation may commence as indicated by block 300 in FIG. 19. The required parameters and data will be retrieved on the CPU bus 28 from the memory 30 by the CPU from time to time during the logging operation and particularly as the operation commences, as indicated by block 302. For example, digital representations of the desired gain will be delivered on bus 28 to the gain control 34. In like manner, parameters such as the inelastic and capture gating values, discriminator thresholds, and the like will be delivered on CPU bus 26 to the multi-parameter analyzer 22. Also, in the initialization stage of the logging system, prior to generating data all of the various accumulator and scratch memories and buffers must be cleared to ready the system for new data being acquired as functionally represented by block 304. Thus, for example, the memory 180 in the accumulator 60 of analyzer will be cleared in response to appropriate CPU 24 command signals on buffer 26.

Still referring to FIG. 19, the system 12 will then commence operation with the traversal of the instrument 12 along the borehole. During this time, as previously described, gamma ray pulses will be detected by the detector 14, their arrival times and pulse heights determined from the analyzer and stored in the appropriate memory locations so as to derive the desired spectra in the analyzer 22. Inasmuch as a preferred version of the system is depth-based, depth interrupt commands will periodically be generated at the surface and transmitted to the system 12 via the cable 20 indicating that the instrument is at preselected depths within the borehole. When such a command is received, as indicated by block 306, this is a command to the system 12 to obtain data from the receiver 256 in modem 32, as indicated in block 308. Prior to doing so, the CPU 24, by system operating software in memory 30, will determine if the command is valid as shown in block 312, and if not, will generate a command delivered to the surface indicating that the command was not valid so as to inhibit transfer of data in the data buffer.

While still awaiting a valid command signal, the system 12 will then perform a check of data which has been acquired and formed into a spectrum in the analyzer 22. More particularly, as previously described, one usage of the pulse arrival time or time-distribution spectrum acquired by the analyzer 22 is for purposes of source tracking or locating the peak of the burst of neutrons from the source 16. Accordingly, as indicated by block 310, the CPU 24 will then interrogate via the DMA bus 26 in response to program control from memory 30, the appropriate memory locations in the accumulator 60 corresponding to the time-distribution spectrum to locate the channel having the maximum count, such as channel 100 as shown in FIG. 4 which corresponds to a discrete reoccurring time relating to the source firing. The CPU 24 will then compare the time occurrence of these source burst peaks with the selected gating positions such as the inelastic and capture gates which have been downloaded previously as just described to insure that the gates are located in the proper and desired positions relative to the actual source burst peaks as actually determined in block 310. This step may be seen schematically indicated as block 318. If the gates have shifted due to variance in the source burst peak for various reasons, the CPU 24 will calculate, again under system operating software control stored in memory 30, appropriate adjustments to these gates as shown by 320, will store these adjusted gate values, and recycle to block 306 into an idle loop waiting for additional commands from the surface, as indicated by block 320.

Referring again to block 312, if a command has been received from the surface and has been invalidated in block 312 by the CPU 24, this corresponds to an instruction to transmit the logging data stored in the analyzer 22 to the surface. Accordingly, as shown by blocks 316 and 322, the CPU 24 will execute such command transmitting the data and also transmit a signal to the surface indicating that the transmit data buffer status is good. The system will thereafter cycle to once again check the source burst peak to make adjustments as necessary as indicated by block 310.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

The embodiments of the invention in which an exclusive property or privilege is claimed is defined as follows:

1. Apparatus for subsurface acquisition of nuclear well logging data, comprising:
   detector means for generating a series of electrical indications corresponding to a series of discrete nuclear events;
   buffer means for storing said series of electrical indications in sequential order of detection;
   means for retrieving from said buffer means said series of electrial indications in sequential order of storage;
   memory means for accumulating said electrical indications, wherein said electrical indications stored in said memory means is a time or energy gamma ray spectrum; and
   processor means for retrieving from said memory means said accumulated electrical indications, without interrupting said accumulating said electrical indications in said memory means, and processing said accumulated electrical indications, wherein said processing of said electrical indications comprises deriving a function of said spectrum, wherein said function of said spectrum is a control signal; and
   wherein said apparatus further includes subsurface control means responsive to said control signal.

2. A method of gain control for nuclear well logging of a subsurface earth formation, comprising:
   disposing a logging tool within a borehole having a housing encasing a gamma ray detector;
   detecting gamma rays with said detector incident on said housing from said formation;
   deriving an energy spectrum of said detected gamma rays within said tool;

detecting an energy peak in said spectrum wherein said peak corresponds to gamma rays from material; and adjusting gain in said detector of said gamma rays as a function of relative position of said peak and said spectrum.

3. The method of claim 2, wherein said material is a material in said formation.

4. The method of claim 3, wherein said material is hydrogen in said formation.

5. The method of claim 2, wherein said material is a material in said housing.

6. The method of claim 5, wherein said material is iron in said housing.

7. The method of claim 2, wherein said energy spectrum is a capture spectrum.

8. The method of claim 7, wherein
said detector comprises a photomultiplier tube; and
wherein said step of adjusting said gain of said detector comprises adjusting the voltage supply to said tube photomultiplier.

9. A method of nuclear well logging comprising the steps of:
disposing a pulsed neutron source within a subsurface earth formation;
activating said source a first time;
deriving a subsurface electrical representation of an energy spectrum of said detected gamma rays;
deriving simultaneously a subsurface electrical representation of a time spectrum of said detected gamma rays;
activating said source a second time; and
deriving from said representation of said time spectrum electrical representations functionally related to thermal neutron decay between said activations of said source.

10. The method of claim 9, further including:
activating a total count gate during said first activation of said source;
activating a capture gate prior to and after said activation of said total count gate; and
deriving a subsurface electrical representation of a capture energy spectrum functionally related to gamma rays in said time spectrum detected during said capture gate.

11. Apparatus for acquiring spectral well logging data from a subsurface earth formation comprising:
detector means for generating electrical indications of subsurface gamma ray particles;
pulse height analyzer means for deriving a digital representation of the energy magnitude of each of said gamma ray particles from said electrical indications;
pulse arrival time means for deriving a digital representation corresponding to the arrival time of each of said gamma ray particles from said electrical indication;
storage means for correlatively storing said digital representations of said energy and arrival time for each of said gamma ray particles; and
subsurface processor means for deriving from said stored digital representations time and energy spectra and for detecting peaks in said derived spectra.

12. The apparatus of claim 11, further including:
reference clock means for generating a plurality of source firing pulses; and
source means for introducing high energy neutrons into said formation in response to said pulses.

13. The apparatus of claim 11, further including:
gate generating means for generating a first gate durring substantial presence of said neutrons and a second gate during substantial absence of said neutrons.

14. The apparatus of claim 13, further including:
address generating means for generating a first numerical sequence of address codes in response to each said firing pulse, each said code corresponding to a different time interval after one of said pulses.

15. A method of subsurface acquisition of nuclear well logging data, comprising the steps of:
generating a series of electrical indications corresponding to a series of detected discrete nuclear events, wherein said electrical indications of said nuclear events correspond to the arrival times of detection and the energy level of said nuclear events;
sequentially storing said series of electrical indications in a first storage;
sequentially retrieving, the the sequential order stored, said series of electrical indications from said first storage; and
accumulating said sequentially retrieved electrical indications in a second storage.

16. The method of claim 15 wherein said accumulated electrical indications comprise time and energy distribution spectra.

17. A method of subsurface acquisition of nuclear well logging data, comprising the steps of:
generating a series of electrical indications corresponding to a series of detected discrete nuclear events;
sequentially storing said series of electrical indications in a first storage;
sequentially retrieving, in the sequential order stored, said series of electrical indications from said first storage; and
accumulating said sequentially retrieved electrical indications in a second storage wherein said accumulating said sequentially retrieved electrical indications in said second storage further comprises the step of incrementing memory locations in said second storage in response to said retrieved electrical indications.

18. The method of claim 17, further comprising the step of retrieving said accumulated electrical indications from said second storage without interrupting said accumulating of said sequentially retrieved electrical indications in said second storage.

19. The method of claim 17, wherein said electrical indications of said nuclear events correspond to the arrival times of detection of said nuclear events.

20. The method of claim 19 wherein said accumulated electrical indications comprise a time distribution spectrum.

21. The method of claim 17, wherein said electrical indications of said nuclear events correspond to the energy level of said nuclear events.

22. The method of claim 21 wherein said accumulated electrical indications comprise an energy distribution spectrum.

23. Apparatus for subsurface acquisition of nuclear well logging data, comprising:
detector means for generating a series of electrical indications corresponding to a series of discrete nuclear events, wherein said electrical indications comprises the arrival times and energy level of said nuclear events;

buffer means for storing said series of electrical indications in sequential order of detection;

means for retrieving from said buffer means said series of electrial indications in sequential order of storage;

memory means for accumulating said electrical indications; and processor means for retrieving from said memory means said accumulated electrical indications, without interrupting said accumulating said electrical indications in said memory means, and processing said accumulated electrical indications.

* * * * *